US011875645B2

(12) United States Patent
Bouvier et al.

(10) Patent No.: US 11,875,645 B2
(45) Date of Patent: Jan. 16, 2024

(54) GAMING SYSTEMS AND METHODS FOR DYNAMIC AWARD SYMBOLS

(71) Applicant: LNW Gaming, Inc., Las Vegas, NV (US)

(72) Inventors: George Bouvier, Henderson, NV (US); Mario McGregor, Las Vegas, NV (US); Kenneth Shawn Soong, Henderson, NV (US)

(73) Assignee: LNW Gaming, Inc., Las Vegas, NV (US)

( * ) Notice: Subject to any disclaimer, the term of this patent is extended or adjusted under 35 U.S.C. 154(b) by 0 days.

(21) Appl. No.: 17/590,894

(22) Filed: Feb. 2, 2022

(65) Prior Publication Data

US 2023/0245528 A1 Aug. 3, 2023

(51) Int. Cl.
*G07F 17/32* (2006.01)

(52) U.S. Cl.
CPC ...... *G07F 17/3267* (2013.01); *G07F 17/3213* (2013.01); *G07F 17/3225* (2013.01)

(58) Field of Classification Search
CPC .......................... G07F 17/3267; G07F 17/3213
See application file for complete search history.

(56) References Cited

U.S. PATENT DOCUMENTS

| | | | |
|---|---|---|---|
| 3,733,075 | A | 5/1973 | Hooker et al. |
| 4,198,052 | A | 4/1980 | Gauselmann |
| 4,732,386 | A | 3/1988 | Rayfiel |
| 5,100,137 | A | 3/1992 | Fulton |
| 5,152,529 | A | 10/1992 | Okada |
| 5,205,555 | A | 4/1993 | Hamano |
| 5,342,047 | A | 8/1994 | Heidel et al. |
| 5,356,140 | A | 10/1994 | Dabrowski et al. |
| 5,393,061 | A | 2/1995 | Manship et al. |

(Continued)

FOREIGN PATENT DOCUMENTS

| | | | |
|---|---|---|---|
| AU | 2001055957 | A1 | 3/2002 |
| AU | 2013251288 | A1 | 5/2014 |

(Continued)

OTHER PUBLICATIONS

Ancient Arcadia game brochure, Copyright 2011 IGT.

(Continued)

*Primary Examiner* — Chase E Leichliter

(57) ABSTRACT

A gaming system comprises a display device configured to present a plurality of symbol positions and game-logic circuitry. The game-logic circuitry generates a game cycle counter for a game feature at an initial value, for each game cycle outcome of a plurality of game cycle outcomes, updates the current count of the game cycle counter and causes the display device to: (i) populate the symbol positions with randomly selected symbols and (ii) in response to the randomly selected symbols including an award symbol, present an award sequence for a set of award values associated with the award symbol, wherein the number of award values within the set of award values is at least partially a function of the current count of the game cycle counter. The game-logic circuitry further causes, in response to the current count reaching a termination value, the display device to conclude the game feature.

20 Claims, 9 Drawing Sheets

(56) References Cited

U.S. PATENT DOCUMENTS 5,395,111 A 3/1995 Noue
5,431,408 A 7/1995 Adams
5,511,781 A 4/1996 Wood et al.
5,618,232 A 4/1997 Martin
5,695,188 A 12/1997 Ishibashi
5,704,835 A 1/1998 Dietz
5,722,891 A 3/1998 Inoue
5,752,881 A 5/1998 Inoue
5,766,074 A 6/1998 Cannon et al.
5,788,573 A 8/1998 Baerlocher et al.
5,807,177 A 9/1998 Takemoto et al.
5,810,665 A 9/1998 Takemoto et al.
5,833,537 A 11/1998 Barrie
5,848,932 A 12/1998 Adams
5,855,515 A 1/1999 Pease et al.
5,876,284 A 3/1999 Acres et al.
5,882,259 A 3/1999 Holmes et al.
5,882,261 A 3/1999 Adams
5,890,962 A 4/1999 Takemoto
5,911,418 A 6/1999 Adams
5,947,820 A 9/1999 Morro et al.
5,951,397 A 9/1999 Dickinson
5,988,638 A 11/1999 Rodesch et al.
6,004,207 A 12/1999 Wilson et al.
6,027,115 A 2/2000 Griswold et al.
6,033,307 A 3/2000 Vancura
6,048,269 A 4/2000 Burns et al.
6,050,895 A 4/2000 Luciano et al.
6,056,642 A 5/2000 Bennett
6,089,976 A 7/2000 Schneider et al.
6,089,977 A 7/2000 Bennett
6,102,798 A 8/2000 Bennett
6,120,031 A 9/2000 Adams
6,142,873 A 11/2000 Weiss et al.
6,159,097 A 12/2000 Gura
6,162,121 A 12/2000 Morro et al.
6,168,520 B1 1/2001 Baerlocher et al.
6,186,894 B1 2/2001 Mayeroff
6,203,429 B1 3/2001 Demar et al.
6,213,875 B1 4/2001 Suzuki
6,224,482 B1 5/2001 Bennett
6,224,483 B1 5/2001 Mayeroff
6,224,484 B1 5/2001 Okuda et al.
6,227,971 B1 5/2001 Weiss
6,241,607 B1 6/2001 Payne et al.
6,251,013 B1 6/2001 Bennett
6,270,411 B1 8/2001 Gura et al.
6,270,412 B1 8/2001 Crawford et al.
6,290,600 B1 9/2001 Glasson
6,309,300 B1 10/2001 Glavich
6,319,124 B1 11/2001 Baerlocher et al.
6,375,567 B1 4/2002 Acres
6,375,570 B1 4/2002 Poole
6,413,162 B1 7/2002 Baerlocher et al.
6,481,713 B2 11/2002 Perrie et al.
6,517,432 B1 2/2003 Jaffe
6,517,433 B2 2/2003 Loose et al.
6,537,150 B1 3/2003 Luciano et al.
6,544,120 B2 4/2003 Ainsworth
6,547,242 B1 4/2003 Sugiyama et al.
6,551,187 B1 4/2003 Jaffe
6,554,704 B2 4/2003 Nicastro et al.
6,558,254 B2 5/2003 Baelocher et al.
6,561,900 B1 5/2003 Baerlocher et al.
6,561,904 B2 5/2003 Locke et al.
6,565,434 B1 5/2003 Acres
6,641,477 B1 11/2003 Dietz
6,652,378 B2 11/2003 Cannon et al.
6,656,040 B1 12/2003 Brosnan et al.
6,657,923 B2 12/2003 Aughlin
6,692,356 B2 2/2004 Baerlocher et al.
6,702,675 B2 3/2004 Poole et al.
6,731,313 B1 5/2004 Kaminkow
6,786,818 B1 9/2004 Rothschild et al.
6,832,957 B2 12/2004 Falconer
6,837,790 B1 1/2005 Kaminkow
6,869,360 B2 3/2005 Marks et al.
6,896,617 B2 5/2005 Daly
6,910,962 B2 6/2005 Marks et al.
6,916,243 B2 7/2005 Yoshida
6,918,834 B2 7/2005 Vancura
6,926,609 B2 8/2005 Martin
6,960,134 B2 11/2005 Hartl et al.
7,018,293 B2 3/2006 Brown et al.
7,029,395 B1 4/2006 Baerlocher
7,029,396 B2 4/2006 Jaffe et al.
7,121,945 B2 10/2006 Suganuma et al.
7,147,559 B2 12/2006 Englman
7,156,740 B2 1/2007 Kaminkow
7,179,169 B2 2/2007 Beaulieu et al.
7,252,591 B2 8/2007 Van Asdale
7,316,613 B2 1/2008 Luccesi et al.
7,371,170 B2 5/2008 Cregan et al.
7,377,850 B2 5/2008 Shackelford et al.
7,431,646 B2 10/2008 Jackson
7,452,276 B2 11/2008 Loose et al.
7,458,890 B2 12/2008 Oose et al.
7,488,252 B2 2/2009 Griswold et al.
7,503,847 B2 3/2009 Baerlocher
7,526,736 B2 4/2009 Kaminkow et al.
7,553,231 B2 6/2009 Rodgers et al.
7,578,735 B2 8/2009 Frizzell et al.
7,601,062 B2 10/2009 Cole et al.
7,604,538 B2 10/2009 Pacey
7,618,319 B2 11/2009 Casey et al.
7,625,278 B2 12/2009 Paulsen et al.
7,654,895 B2 2/2010 Pacey
7,654,899 B2 2/2010 Durham et al.
7,699,699 B2 4/2010 Gilliland et al.
7,704,141 B1 4/2010 Marks et al.
7,727,069 B1 * 6/2010 Nelson ................ G07F 17/3202
463/31
7,744,460 B2 6/2010 Walker et al.
7,785,191 B2 8/2010 Marks et al.
7,789,744 B2 9/2010 Fiden
7,841,934 B2 11/2010 Gauselmann
7,980,936 B2 7/2011 Mead
8,021,223 B2 9/2011 Rose
8,021,225 B2 9/2011 Okada
8,057,303 B2 11/2011 Rasmussen et al.
8,066,563 B1 11/2011 Schultz et al.
8,083,581 B2 12/2011 Marks et al.
8,105,145 B2 1/2012 Jaffe
8,105,151 B2 1/2012 Caputo et al.
8,113,940 B2 2/2012 Hornik
8,147,322 B2 4/2012 Walker et al.
8,162,740 B2 4/2012 Aoki
8,162,741 B2 4/2012 Wadleigh et al.
8,192,275 B2 6/2012 Aoki et al.
8,226,459 B2 7/2012 Barrett et al.
8,246,442 B1 8/2012 Barrie
8,272,938 B2 9/2012 Gilmore et al.
8,287,357 B2 10/2012 Evans
8,323,091 B2 12/2012 Frank et al.
8,357,041 B1 1/2013 Saunders
8,360,851 B2 1/2013 Aoki et al.
8,366,538 B1 2/2013 Saunders et al.
8,371,930 B1 2/2013 Saunders et al.
8,376,847 B1 * 2/2013 Nelson .................... G07F 17/32
463/31
8,388,432 B2 3/2013 Mattice et al.
8,414,380 B2 4/2013 Saunders et al.
8,465,358 B2 6/2013 Kemper
8,496,522 B2 7/2013 Caputo et al.
8,512,121 B2 8/2013 Macvittie et al.
8,512,124 B2 8/2013 Bramble et al.
8,512,138 B2 8/2013 Saunders
8,523,659 B2 9/2013 Evans
8,574,059 B2 11/2013 Rodgers et al.
8,591,330 B2 11/2013 Kelly et al.
8,602,868 B2 12/2013 Johnson et al.
8,608,545 B2 12/2013 Arora et al.
8,662,986 B2 3/2014 Rodgers et al.
8,678,908 B2 3/2014 Nicely

(56) References Cited

U.S. PATENT DOCUMENTS 8,690,660 B2 4/2014 Saunders et al.
8,696,434 B2 4/2014 Tsukahara
8,702,487 B2 4/2014 Thomas
8,771,054 B2 7/2014 Aoki et al.
8,790,169 B2 7/2014 Saunders
8,795,059 B2 8/2014 Aoki et al.
8,821,254 B2 9/2014 Tsukahara
8,834,258 B2 9/2014 Gobe et al.
8,851,974 B2 10/2014 Caputo et al.
8,870,642 B2 10/2014 Leupp et al.
8,882,578 B2 11/2014 Saunders
8,961,291 B2 2/2015 Dias Pires et al.
9,005,022 B2 4/2015 Saunders
9,011,233 B2 4/2015 Ryan
9,098,847 B2 8/2015 Basallo et al.
9,098,973 B2 8/2015 Basallo et al.
9,147,321 B2 9/2015 Moody
9,165,433 B2 10/2015 Caputo
9,177,447 B2 11/2015 Zoltewicz et al.
9,202,345 B2 12/2015 Zoltewicz et al.
9,214,011 B2 12/2015 Wei et al.
9,230,410 B2 1/2016 Saunders et al.
9,245,421 B2 1/2016 Saunders et al.
9,251,667 B2 2/2016 Marks et al.
9,257,017 B2 2/2016 Saunders et al.
9,262,895 B2 2/2016 Rodgers et al.
9,275,524 B2 3/2016 Nicely
9,299,224 B2 3/2016 Leupp
9,311,781 B2 4/2016 Edwards
9,349,251 B2 5/2016 Caputo et al.
9,355,528 B2 5/2016 Nicely
9,418,521 B1 8/2016 Henrick et al.
9,424,720 B2 8/2016 Suda
9,430,900 B2 8/2016 Zoltewicz et al.
9,466,169 B2 10/2016 Basallo et al.
9,474,972 B2 10/2016 Lenger
9,495,839 B2 11/2016 Aoki et al.
9,595,157 B2 3/2017 Rasmussen et al.
9,633,506 B2 4/2017 Basallo et al.
9,704,342 B2 7/2017 Aoki et al.
9,928,691 B2 3/2018 Olive
10,013,855 B2 7/2018 Nakamura
10,037,651 B2 7/2018 You et al.
10,043,350 B2 8/2018 Gomez et al.
10,062,237 B2 8/2018 Devine et al.
10,204,473 B2 2/2019 Lenger
10,242,533 B2 3/2019 Okada et al.
10,339,761 B2 7/2019 Olive
10,366,575 B2 7/2019 Visser
10,388,112 B2 8/2019 You et al.
10,410,472 B2 9/2019 Moody
10,417,877 B2 9/2019 Gomez et al.
10,424,149 B1 * 9/2019 Halvorson ............ G07F 17/326
10,475,294 B2 11/2019 Gomez et al.
10,497,203 B2 12/2019 Elmqvist
10,672,220 B2 6/2020 Enger
10,706,664 B2 7/2020 Boese et al.
10,726,676 B2 7/2020 You et al.
10,769,888 B2 9/2020 You et al.
10,839,648 B2 11/2020 Okada et al.
10,957,161 B2 3/2021 Chesworth et al.
11,017,638 B2 5/2021 Chesworth et al.
11,423,743 B2 * 8/2022 Nelson ................ G07F 17/3267
2001/0021666 A1 9/2001 Yoshida et al.
2002/0016200 A1 2/2002 Baerlocher et al.
2002/0045474 A1 4/2002 Singer et al.
2002/0119818 A1 8/2002 Savio et al.
2002/0155881 A1 10/2002 Yoshida
2002/0183105 A1 12/2002 Cannon et al.
2003/0017865 A1 1/2003 Beaulieu et al.
2003/0027619 A1 2/2003 Nicastro, Sr.
2003/0035346 A1 2/2003 Laughlin
2003/0064782 A1 4/2003 Beaulieu et al.
2003/0064801 A1 4/2003 Breckner et al.
2003/0064802 A1 4/2003 Rodgers et al.
2003/0069063 A1 4/2003 Bilyeu et al.
2003/0130034 A1 7/2003 Suganuma et al.
2003/0157980 A1 8/2003 Oose et al.
2003/0216165 A1 11/2003 Singer et al.
2004/0012145 A1 1/2004 Inoue
2004/0023714 A1 2/2004 Asdale
2004/0043815 A1 3/2004 Kaminkow
2004/0048646 A1 3/2004 Visocnik
2004/0092315 A1 5/2004 Boyd et al.
2004/0137982 A1 7/2004 Cuddy et al.
2004/0171417 A1 9/2004 Beaulieu et al.
2004/0198489 A1 10/2004 Kaminkow et al.
2005/0054442 A1 3/2005 Anderson et al.
2005/0130731 A1 6/2005 Englman et al.
2005/0159208 A1 7/2005 Pacey
2006/0009286 A1 1/2006 Durham et al.
2006/0063588 A1 3/2006 Poole
2006/0111173 A1 5/2006 Yang
2006/0142080 A1 6/2006 Enzminger
2006/0189369 A1 8/2006 Taylor
2006/0205469 A1 9/2006 Schultz et al.
2006/0247002 A1 11/2006 Yoshimi et al.
2007/0060248 A1 3/2007 Rodgers et al.
2007/0060255 A1 3/2007 Baerlocher et al.
2007/0060275 A1 3/2007 Gilmore et al.
2007/0129135 A1 6/2007 Marks et al.
2007/0149267 A1 6/2007 Ross et al.
2007/0281784 A1 12/2007 Seelig et al.
2007/0287529 A1 12/2007 Kojima
2008/0003278 A1 1/2008 Mondelo
2008/0004532 A1 1/2008 Rubey et al.
2008/0032784 A1 2/2008 Englman
2008/0045298 A1 2/2008 Yoshizawa
2008/0045320 A1 2/2008 Kato
2008/0108408 A1 5/2008 Wolf
2008/0108411 A1 5/2008 Jensen et al.
2008/0108422 A1 5/2008 Hedrick et al.
2008/0108431 A1 * 5/2008 Cuddy ................ G07F 17/3276
463/27
2008/0132321 A1 6/2008 Pau
2008/0161098 A1 * 7/2008 Nelson ................ G07F 17/3244
463/20
2008/0171589 A1 * 7/2008 Nelson ................ G07F 17/3244
463/20
2008/0171590 A1 * 7/2008 Nelson .................... G07F 17/32
463/20
2008/0176636 A1 * 7/2008 Nelson ................ G07F 17/3286
463/20
2008/0182647 A1 7/2008 Brunet De Courssou et al.
2008/0274789 A1 11/2008 Singer et al.
2009/0036208 A1 2/2009 Pennington et al.
2009/0156287 A1 6/2009 Baumgartner
2009/0181755 A1 7/2009 Gagner et al.
2009/0239634 A1 9/2009 Nguyen
2009/0291741 A1 11/2009 Schofield
2010/0075737 A1 3/2010 Bluemel
2010/0081497 A1 * 4/2010 Wolf ....................... G07F 17/32
463/43
2010/0113133 A1 5/2010 Leupp
2010/0167815 A1 7/2010 Gagner et al.
2010/0203948 A1 8/2010 Falciglia, Sr.
2010/0210343 A1 8/2010 Englman et al.
2010/0234092 A1 9/2010 Gomez et al.
2010/0304832 A1 12/2010 Kup-Ferroth
2011/0244943 A1 10/2011 Milford et al.
2011/0269523 A1 * 11/2011 Nicely ................ G07F 17/3258
463/18
2011/0300937 A1 12/2011 Crowder, Jr. et al.
2012/0015707 A1 1/2012 Hornik et al.
2012/0034965 A1 2/2012 Masen et al.
2012/0077564 A1 3/2012 Collette et al.
2012/0094738 A1 4/2012 Aoki et al.
2012/0122532 A1 5/2012 Berman et al.
2012/0178517 A1 7/2012 Montenegro et al.
2012/0220360 A1 8/2012 Kelly et al.
2013/0053124 A1 2/2013 Masen et al.
2013/0065663 A1 3/2013 Johnson et al.
2013/0102375 A1 4/2013 Aoki et al.

(56) References Cited

U.S. PATENT DOCUMENTS

2013/0150143 A1* 6/2013 Nelson .................... G07F 17/32 463/20
2013/0244753 A1* 9/2013 Nelson .................... G07F 17/34 463/20
2013/0252704 A1 9/2013 Gilbertson et al.
2013/0260861 A1 10/2013 Vann et al.
2013/0324217 A1 12/2013 Gilbertson et al.
2014/0014186 A1 1/2014 Bhattacharya et al.
2014/0024429 A1 1/2014 Aoki et al.
2014/0051496 A1 2/2014 Meyer
2014/0094268 A1* 4/2014 Adams ................ G07F 17/3288 463/21
2014/0121001 A1* 5/2014 Nelson ................ G07F 17/3202 463/20
2014/0141860 A1 5/2014 Meyer
2014/0179396 A1 6/2014 Aoki et al.
2014/0274292 A1 9/2014 Suda
2014/0323198 A1* 10/2014 Tuck ..................... G07F 17/323 463/20
2015/0031437 A1 1/2015 Gomez et al.
2015/0170462 A1 6/2015 Berman et al.
2015/0206386 A1 7/2015 Jaffe et al.
2015/0269809 A1 9/2015 Smith
2015/0287269 A1 10/2015 Berman
2015/0287286 A1* 10/2015 Beria .................. G07F 17/3262 463/20
2015/0356833 A1 12/2015 Aoki et al.
2015/0379831 A1 12/2015 Lee et al.
2016/0042597 A1 2/2016 Olive
2016/0155303 A1 6/2016 Aoki et al.
2017/0154498 A1 6/2017 Olive
2017/0372558 A1 12/2017 You et al.
2018/0130303 A1 5/2018 Amb
2018/0268655 A1 9/2018 Olive
2018/0268659 A1* 9/2018 Chesworth .......... G07F 17/3209
2019/0102992 A1 4/2019 You et al.
2019/0236905 A1 8/2019 Washington et al.
2019/0244481 A1* 8/2019 Jaffe ........................ G07F 17/34
2020/0334958 A1* 10/2020 Davis .................. G07F 17/3209
2021/0209891 A1* 7/2021 Nakamura .......... G07F 17/3225
2021/0304565 A1* 9/2021 Marks ................. G07F 17/3267
2022/0395744 A1* 12/2022 Marsh ................. G07F 17/3267
2023/0025925 A1* 1/2023 Davis ....................... G07F 17/34
2023/0245528 A1* 8/2023 Bouvier .............. G07F 17/3267 463/20

FOREIGN PATENT DOCUMENTS

AU 2014202042 A1 5/2014
AU 2015210489 A1 2/2016
GB 2097160 A 10/1982
GB 2097160 B 5/1984
GB 2144568 A 3/1985
GB 2144568 B 9/1985
GB 2251112 A 6/1992

OTHER PUBLICATIONS

Flying Carpet game brochure, Copyright 2008 Bally.
Golden Knight game brochure, Copyright 2010 IGT.
Sultan of Mars game brochure, Copyright 2011 IGT.
The Amulet and the Charm game brochure, Copyright 2011 IGT.
Product Sheet for "Vikings Creed," Released Oct. 2020, Slotmill Limited.
"Jack and the Beanstalk" Game Sheet, Copyright 2017 NetEnt Product Services Ltd.

* cited by examiner

GAMING SYSTEMS AND METHODS FOR DYNAMIC AWARD SYMBOLS

COPYRIGHT

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2022, SG Gaming, Inc.

FIELD

The present disclosure relates generally to gaming systems, apparatus, and methods and, more particularly, to dynamic award symbols that provide one or more award values based on at least one dynamic game parameter.

BACKGROUND

The gaming industry depends upon player participation. Players are generally "hopeful" players who either think they are lucky or at least think they can get lucky—for a relatively small investment to play a game, they can get a disproportionately large return. To create this feeling of luck, a gaming apparatus relies upon an internal or external random element generator to generate one or more random elements such as random numbers. The gaming apparatus determines a game outcome based, at least in part, on the one or more random elements.

A significant technical challenge is to improve the operation of gaming apparatus and games played thereon, including the manner in which they leverage the underlying random element generator, by making them yield a negative return on investment in the long run (via a high quantity and/or frequency of player/apparatus interactions) and yet random and volatile enough to make players feel they can get lucky and win in the short run. Striking the right balance between yield versus randomness and volatility to create a feeling of luck involves addressing many technical problems, some of which can be at odds with one another. This luck factor is what appeals to core players and encourages prolonged and frequent player participation. As the industry matures, the creativity and ingenuity required to improve such operation of gaming apparatus and games grows accordingly.

Another significant technical challenge is to improve the operation of gaming apparatus and games played thereon by increasing processing speed and efficiency of usage of processing and/or memory resources. To make games more entertaining and exciting, they often offer the complexities of advanced graphics and special effects, multiple bonus features with different game formats, and multiple random outcome determinations per feature. The game formats may, for example, include picking games, reel spins, wheel spins, and other arcade-style play mechanics. Inefficiencies in processor execution of the game software can slow down play of the game and prevent a player from playing the game at their desired pace.

Yet another significant technical challenge is to provide a new and improved level of game play that uses new and improved gaming apparatus animations. Improved animations represent improvements to the underlying technology or technical field of gaming apparatus and, at the same time, have the effect of encouraging prolonged and frequent player participation.

SUMMARY

According to one aspect of the present invention, a gaming system comprises a display device configured to present a plurality of symbol positions and game-logic circuitry. The game-logic circuitry generates a game cycle counter for a game feature at an initial value, for each game cycle outcome of a plurality of game cycle outcomes, updates the current count of the game cycle counter and causes the display device to: (i) populate the symbol positions with randomly selected symbols and (ii) in response to the randomly selected symbols including an award symbol, present an award sequence for a set of award values associated with the award symbol, wherein the number of award values within the set of award values is at least partially a function of the current count of the game cycle counter. The game-logic circuitry further causes, in response to the current count reaching a termination value, the display device to conclude the game feature. The gaming system may be incorporated into a single, freestanding gaming machine.

According to another aspect of the invention, a computer-implemented method of conducting a game using a gaming system is provided. The gaming system comprises game-logic circuitry and a gaming machine including a display device configured to present a plurality of symbol positions. The method comprises generating, by the game-logic circuitry, a game cycle counter for a game feature at an initial value. The method further comprises, for each game cycle outcome of a plurality of game cycle outcomes, updating, by the game-logic circuitry, the current count of the game cycle counter and causing the display device to: (i) populate the plurality of symbol positions with randomly selected symbols and (ii) in response to the randomly selected symbols including an award symbol, present an award sequence for a set of award values associated with the award symbol, wherein the number of award values within the set of award values is at least partially a function of the current count of the game cycle counter. The method further comprises causing, by the game-logic circuitry and in response to the current count reaching a termination value, the display device to conclude the game feature.

Additional aspects of the invention will be apparent to those of ordinary skill in the art in view of the detailed description of various embodiments, which is made with reference to the drawings, a brief description of which is provided below.

Figure 1:
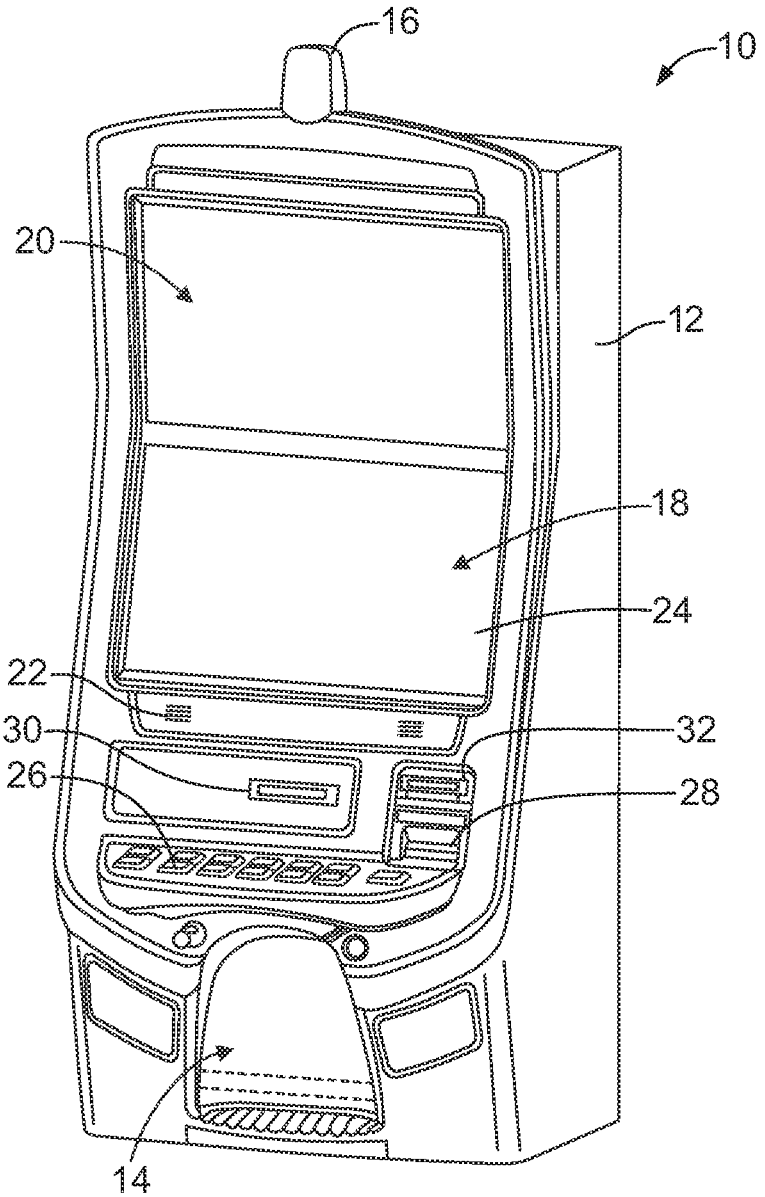
FIG. 1 is a perspective view of a free-standing gaming machine according to one or more embodiments of the present disclosure.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

While this invention is susceptible of embodiment in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. For purposes of the present detailed description, the singular includes the plural and vice versa (unless specifically disclaimed); the words "and" and "or" shall be both conjunctive and disjunctive; the word "all" means "any and all"; the word "any" means "any and all"; and the word "including" means "including without limitation."

For purposes of the present detailed description, the terms "wagering game," "casino wagering game," "gambling," "slot game," "casino game," and the like include games in which a player places at risk a sum of money or other representation of value, whether or not redeemable for cash, on an event with an uncertain outcome, including without limitation those having some element of skill. In some embodiments, the wagering game involves wagers of real money, as found with typical land-based or online casino games. In other embodiments, the wagering game additionally, or alternatively, involves wagers of non-cash values, such as virtual currency, and therefore may be considered a social or casual game, such as would be typically available on a social networking web site, other web sites, across computer networks, or applications on mobile devices (e.g., phones, tablets, etc.). When provided in a social or casual game format, the wagering game may closely resemble a traditional casino game, or it may take another form that more closely resembles other types of social/casual games.

Embodiments of the present disclosure comprise an innovative application of data processing steps that, when implemented by game-logic circuitry, direct an electronic display device to present a symbol-value aggregation and/or dynamic award symbol process that minimizes processing overhead by utilizing numbered indicia to represent credit values instead of complex, fanciful game images. Further, the process aggregates displayed values borne by special symbols (i.e., value-bearing symbols) and/or other game presentation elements according to stored, variable criteria. In this way, the value-bearing game elements provide building blocks for innumerable different aggregation sequences simply by manipulating the aggregation criteria associated with the value-bearing symbols, resulting in fewer rules needed for the aggregation process than would be necessary for calculating values of winning symbol combinations enumerated in stored paytables, as found in prior art reel-spinning routines. At the same time, embodiments of the present invention provide a straightforward, what-you-see-is-what-you-get (WYSIWYG) visual presentation that is simple to understand and, therefore, effective in generating player excitement and enthusiasm. The result is a highly flexible value-aggregation process that can be easily adapted to any theme/brand while remaining easily understood by players.

Referring to FIG. 1, there is shown a gaming machine 10 similar to those operated in gaming establishments, such as casinos. With regard to the present invention, the gaming machine 10 may be any type of gaming terminal or machine and may have varying structures and methods of operation. For example, in some aspects, the gaming machine 10 is an electromechanical gaming terminal configured to play mechanical slots, whereas in other aspects, the gaming machine is an electronic gaming terminal configured to play a video casino game, such as slots, keno, poker, blackjack, roulette, craps, etc. The gaming machine 10 may take any suitable form, such as floor-standing models as shown, handheld mobile units, bartop models, workstation-type console models, etc. Further, the gaming machine 10 may be primarily dedicated for use in playing wagering games, or may include non-dedicated devices, such as mobile phones, personal digital assistants, personal computers, etc. Exemplary types of gaming machines are disclosed in U.S. Pat. Nos. 6,517,433, 8,057,303, and 8,226,459, which are incorporated herein by reference in their entireties.

The gaming machine 10 illustrated in FIG. 1 comprises a gaming cabinet 12 that securely houses various input devices, output devices, input/output devices, internal electronic/electromechanical components, and wiring. The cabinet 12 includes exterior walls, interior walls and shelves for mounting the internal components and managing the wiring, and one or more front doors that are locked and require a physical or electronic key to gain access to the interior compartment of the cabinet 12 behind the locked door. The cabinet 12 forms an alcove 14 configured to store one or more beverages or personal items of a player. A notification mechanism 16, such as a candle or tower light, is mounted to the top of the cabinet 12. It flashes to alert an attendant that change is needed, a hand pay is requested, or there is a potential problem with the gaming machine 10.

The input devices, output devices, and input/output devices are disposed on, and securely coupled to, the cabinet 12. By way of example, the output devices include a primary display 18, a secondary display 20, and one or more audio speakers 22. The primary display 18 or the secondary display 20 may be a mechanical-reel display device, a video display device, or a combination thereof in which a transmissive video display is disposed in front of the mechanical-reel display to portray a video image superimposed upon the mechanical-reel display. The displays variously display information associated with wagering games, non-wagering games, community games, progressives, advertisements, services, premium entertainment, text messaging, emails, alerts, announcements, broadcast information, subscription information, etc. appropriate to the particular mode(s) of operation of the gaming machine 10. The gaming machine 10 includes a touch screen(s) 24 mounted over the primary or secondary displays, buttons 26 on a button panel, a bill/ticket acceptor 28, a card reader/writer 30, a ticket dispenser 32, and player-accessible ports (e.g., audio output jack for headphones, video headset jack, USB port, wireless transmitter/receiver, etc.). It should be understood that numerous other peripheral devices and other elements exist and are readily utilizable in any number of combinations to create various forms of a gaming machine in accord with the present concepts.

The player input devices, such as the touch screen 24, buttons 26, a mouse, a joystick, a gesture-sensing device, a voice-recognition device, and a virtual-input device, accept player inputs and transform the player inputs to electronic data signals indicative of the player inputs, which correspond to an enabled feature for such inputs at a time of activation (e.g., pressing a "Max Bet" button or soft key to indicate a player's desire to place a maximum wager to play the wagering game). The inputs, once transformed into electronic data signals, are output to game-logic circuitry for processing. The electronic data signals are selected from a group consisting essentially of an electrical current, an electrical voltage, an electrical charge, an optical signal, an optical element, a magnetic signal, and a magnetic element.

The gaming machine 10 includes one or more value input/payment devices and value output/payout devices. In order to deposit cash or credits onto the gaming machine 10, the value input devices are configured to detect a physical item associated with a monetary value that establishes a credit balance on a credit meter such as the "credits" meter 84 (see FIG. 3). The physical item may, for example, be currency bills, coins, tickets, vouchers, coupons, cards, and/or computer-readable storage mediums. The deposited cash or credits are used to fund wagers placed on the wagering game played via the gaming machine 10. Examples of value input devices include, but are not limited to, a coin acceptor, the bill/ticket acceptor 28, the card reader/writer 30, a wireless communication interface for reading cash or credit data from a nearby mobile device, and a network interface for withdrawing cash or credits from a remote account via an electronic funds transfer. In response to a cashout input that initiates a payout from the credit balance on the "credits" meter 84 (see FIG. 3), the value output devices are used to dispense cash or credits from the gaming machine 10. The credits may be exchanged for cash at, for example, a cashier or redemption station. Examples of value output devices include, but are not limited to, a coin hopper for dispensing coins or tokens, a bill dispenser, the card reader/writer 30, the ticket dispenser 32 for printing tickets redeemable for cash or credits, a wireless communication interface for transmitting cash or credit data to a nearby mobile device, and a network interface for depositing cash or credits to a remote account via an electronic funds transfer.

Figure 2:
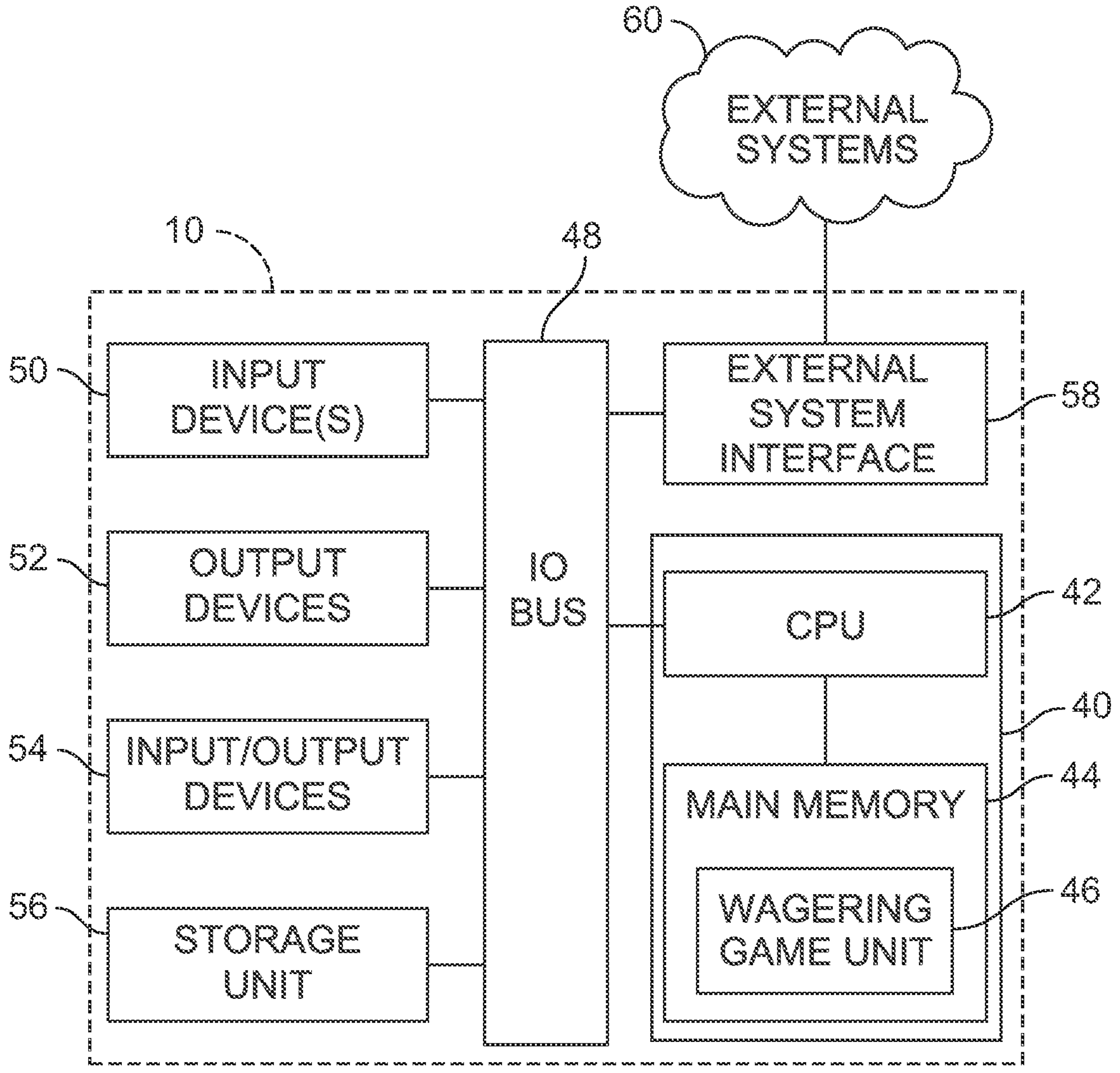
FIG. 2 is a schematic view of a gaming system according to one or more embodiments of the present disclosure.

Turning now to FIG. 2, there is shown a block diagram of the gaming-machine architecture. The gaming machine 10 includes game-logic circuitry 40 securely housed within a locked box inside the gaming cabinet 12 (see FIG. 1). The game-logic circuitry 40 includes a central processing unit (CPU) 42 connected to a main memory 44 that comprises one or more memory devices. The CPU 42 includes any suitable processor(s), such as those made by Intel and AMD. By way of example, the CPU 42 includes a plurality of microprocessors including a master processor, a slave processor, and a secondary or parallel processor. Game-logic circuitry 40, as used herein, comprises any combination of hardware, software, or firmware disposed in or outside of the gaming machine 10 that is configured to communicate with or control the transfer of data between the gaming machine 10 and a bus, another computer, processor, device, service, or network. The game-logic circuitry 40, and more specifically the CPU 42, comprises one or more controllers or processors and such one or more controllers or processors need not be disposed proximal to one another and may be located in different devices or in different locations. The game-logic circuitry 40, and more specifically the main memory 44, comprises one or more memory devices which need not be disposed proximal to one another and may be located in different devices or in different locations. The game-logic circuitry 40 is operable to execute all of the various gaming methods and other processes disclosed herein. The main memory 44 includes a wagering-game unit 46. In one embodiment, the wagering-game unit 46 causes wagering games to be presented, such as video poker, video blackjack, video slots, video lottery, etc., in whole or part.

The game-logic circuitry 40 is also connected to an input/output (I/O) bus 48, which can include any suitable bus technologies, such as an AGTL+ frontside bus and a PCI backside bus. The I/O bus 48 is connected to various input devices 50, output devices 52, and input/output devices 54 such as those discussed above in connection with FIG. 1. The I/O bus 48 is also connected to a storage unit 56 and an external-system interface 58, which is connected to external system(s) 60 (e.g., wagering-game networks).

The external system 60 includes, in various aspects, a gaming network, other gaming machines or terminals, a gaming server, a remote controller, communications hardware, or a variety of other interfaced systems or components, in any combination. In yet other aspects, the external system 60 comprises a player's portable electronic device (e.g., cellular phone, electronic wallet, etc.) and the external-system interface 58 is configured to facilitate wireless communication and data transfer between the portable electronic device and the gaming machine 10, such as by a near-field communication path operating via magnetic-field induction or a frequency-hopping spread spectrum RF signals (e.g., Bluetooth, etc.).

The gaming machine 10 optionally communicates with the external system 60 such that the gaming machine 10 operates as a thin, thick, or intermediate client. The game-logic circuitry 40—whether located within ("thick client"), external to ("thin client"), or distributed both within and external to ("intermediate client") the gaming machine 10—is utilized to provide a wagering game on the gaming machine 10. In general, the main memory 44 stores programming for a random number generator (RNG), game-outcome logic, and game assets (e.g., art, sound, etc.)—all of which obtained regulatory approval from a gaming control board or commission and are verified by a trusted authentication program in the main memory 44 prior to game execution. The authentication program generates a live authentication code (e.g., digital signature or hash) from the memory contents and compare it to a trusted code stored in the main memory 44. If the codes match, authentication is deemed a success and the game is permitted to execute. If, however, the codes do not match, authentication is deemed a failure that must be corrected prior to game execution. Without this predictable and repeatable authentication, the gaming machine 10, external system 60, or both are not allowed to perform or execute the RNG programming or game-outcome logic in a regulatory-approved manner and are therefore unacceptable for commercial use. In other words, through the use of the authentication program, the game-logic circuitry facilitates operation of the game in a way that a person making calculations or computations could not.

When a wagering-game instance is executed, the CPU 42 (comprising one or more processors or controllers) executes the RNG programming to generate one or more pseudo-random numbers. The pseudo-random numbers are divided into different ranges, and each range is associated with a respective game outcome. Accordingly, the pseudo-random numbers are utilized by the CPU 42 when executing the game-outcome logic to determine a resultant outcome for that instance of the wagering game. The resultant outcome is then presented to a player of the gaming machine 10 by accessing the associated game assets, required for the resultant outcome, from the main memory 44. The CPU 42 causes the game assets to be presented to the player as outputs from the gaming machine 10 (e.g., audio and video presentations). Instead of a pseudo-RNG, the game outcome may be derived from random numbers generated by a physical RNG that measures some physical phenomenon that is expected to be random and then compensates for possible biases in the measurement process. Whether the RNG is a pseudo-RNG or physical RNG, the RNG uses a seeding process that relies upon an unpredictable factor (e.g., human interaction of turning a key) and cycles continuously in the background between games and during game play at a speed that cannot be timed by the player, for example, at a minimum of 100 Hz (100 calls per second) as set forth in Nevada's New Gaming Device Submission Package. Accordingly, the RNG cannot be carried out manually by a human and is integral to operating the game.

The gaming machine 10 may be used to play central determination games, such as electronic pull-tab and bingo games. In an electronic pull-tab game, the RNG is used to randomize the distribution of outcomes in a pool and/or to select which outcome is drawn from the pool of outcomes when the player requests to play the game. In an electronic bingo game, the RNG is used to randomly draw numbers that players match against numbers printed on their electronic bingo card.

The gaming machine 10 may include additional peripheral devices or more than one of each component shown in FIG. 2. Any component of the gaming-machine architecture includes hardware, firmware, or tangible machine-readable storage media including instructions for performing the operations described herein. Machine-readable storage media includes any mechanism that stores information and provides the information in a form readable by a machine (e.g., gaming terminal, computer, etc.). For example, machine-readable storage media includes read only memory (ROM), random access memory (RAM), magnetic-disk storage media, optical storage media, flash memory, etc.

Figure 3:
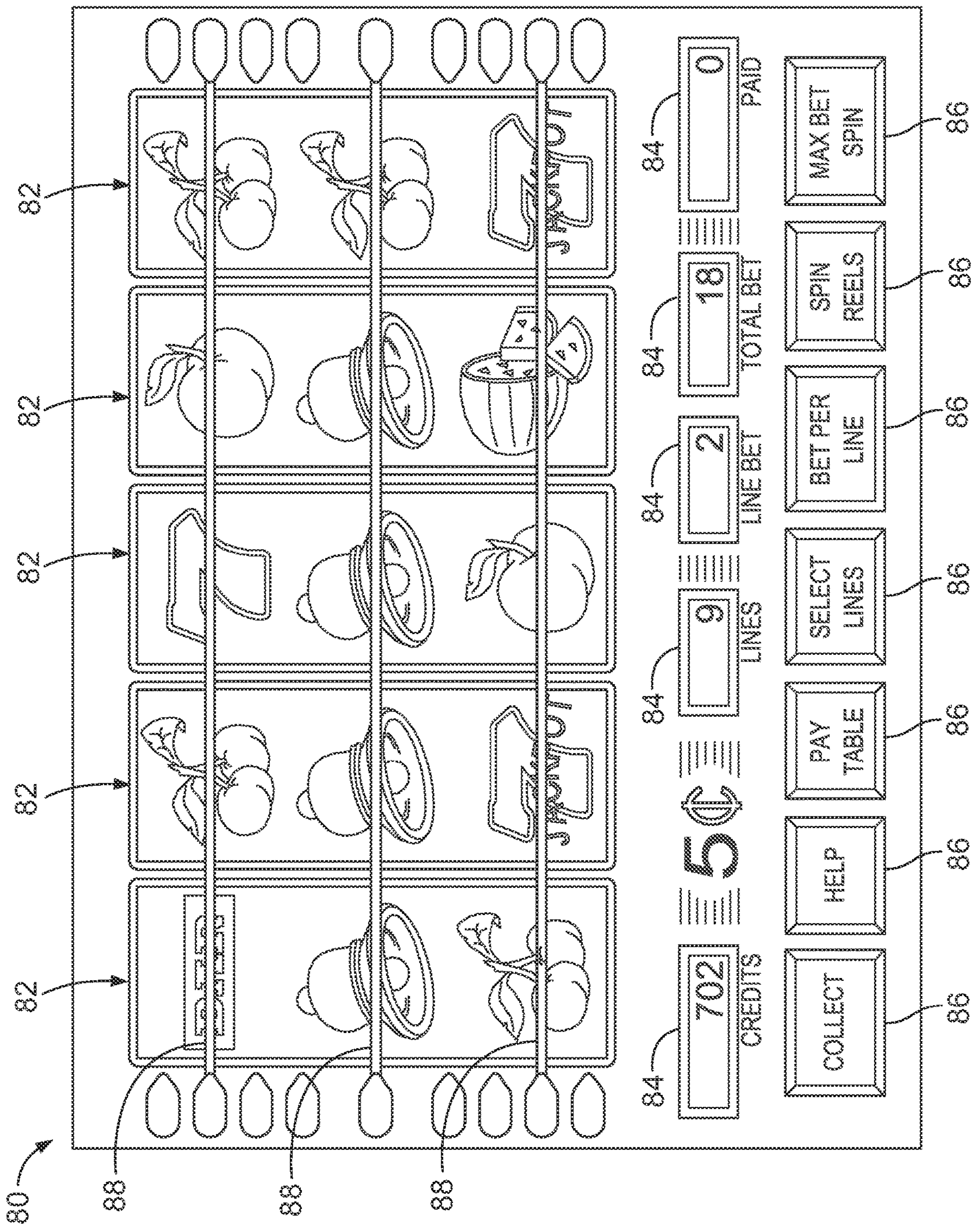
FIG. 3 is an image of an exemplary basic-game screen of a wagering game displayed on a gaming machine, according to one or more embodiments of the present disclosure.

Referring now to FIG. 3, there is illustrated an image of a basic-game screen 80 adapted to be displayed on the primary display 18 or the secondary display 20. The basic-game screen 80 portrays a plurality of simulated symbol-bearing reels 82. Alternatively or additionally, the basic-game screen 80 portrays a plurality of mechanical reels or other video or mechanical presentation consistent with the game format and theme. The basic-game screen 80 also advantageously displays one or more game-session credit meters 84 and various touch screen buttons 86 adapted to be actuated by a player. A player can operate or interact with the wagering game using these touch screen buttons or other input devices such as the buttons 26 shown in FIG. 1. The game-logic circuitry 40 operates to execute a wagering-game program causing the primary display 18 or the secondary display 20 to display the wagering game.

In response to receiving an input indicative of a wager covered by or deducted from the credit balance on the "credits" meter 84, the reels 82 are rotated and stopped to place symbols on the reels in visual association with paylines such as paylines 88. The wagering game evaluates the displayed array of symbols on the stopped reels and provides immediate awards and bonus features in accordance with a pay table. The pay table may, for example, include "line pays" or "scatter pays." Line pays occur when a predetermined type and number of symbols appear along an activated payline, typically in a particular order such as left to right, right to left, top to bottom, bottom to top, etc. Scatter pays occur when a predetermined type and number of symbols appear anywhere in the displayed array without regard to position or paylines. Similarly, the wagering game may trigger bonus features based on one or more bonus triggering symbols appearing along an activated payline (i.e., "line trigger") or anywhere in the displayed array (i.e., "scatter trigger"). The wagering game may also provide mystery awards and features independent of the symbols appearing in the displayed array.

In accord with various methods of conducting a wagering game on a gaming system in accord with the present concepts, the wagering game includes a game sequence in which a player makes a wager and a wagering-game outcome is provided or displayed in response to the wager being received or detected. The wagering-game outcome, for that particular wagering-game instance, is then revealed to the player in due course following initiation of the wagering game. The method comprises the acts of conducting the wagering game using a gaming apparatus, such as the gaming machine 10 depicted in FIG. 1, following receipt of an input from the player to initiate a wagering-game instance. The gaming machine 10 then communicates the wagering-game outcome to the player via one or more output devices (e.g., primary display 18 or secondary display 20) through the display of information such as, but not limited to, text, graphics, static images, moving images, etc., or any combination thereof. In accord with the method of conducting the wagering game, the game-logic circuitry 40 transforms a physical player input, such as a player's pressing of a "Spin Reels" touch key, into an electronic data signal indicative of an instruction relating to the wagering game (e.g., an electronic data signal bearing data on a wager amount).

In the aforementioned method, for each data signal, the game-logic circuitry 40 is configured to process the electronic data signal, to interpret the data signal (e.g., data signals corresponding to a wager input), and to cause further actions associated with the interpretation of the signal in accord with stored instructions relating to such further actions executed by the controller. As one example, the CPU 42 causes the recording of a digital representation of the wager in one or more storage media (e.g., storage unit 56), the CPU 42, in accord with associated stored instructions, causes the changing of a state of the storage media from a first state to a second state. This change in state is, for example, effected by changing a magnetization pattern on a magnetically coated surface of a magnetic storage media or changing a magnetic state of a ferromagnetic surface of a magneto-optical disc storage media, a change in state of transistors or capacitors in a volatile or a non-volatile semiconductor memory (e.g., DRAM, etc.). The noted second state of the data storage media comprises storage in the storage media of data representing the electronic data signal from the CPU 42 (e.g., the wager in the present example). As another example, the CPU 42 further, in accord with the execution of the stored instructions relating to the wagering game, causes the primary display 18, other display device, or other output device (e.g., speakers, lights, communication device, etc.) to change from a first state to at least a second state, wherein the second state of the primary display comprises a visual representation of the physical player input (e.g., an acknowledgement to a player), information relating to the physical player input (e.g., an indication of the wager amount), a game sequence, an outcome of the game sequence, or any combination thereof, wherein the game sequence in accord with the present concepts comprises acts described herein. The aforementioned executing of the stored instructions relating to the wagering game is further conducted in accord with a random outcome (e.g., determined by the RNG) that is used by the game-logic circuitry 40 to determine the outcome of the wagering-game instance. In at least some aspects, the game-logic circuitry 40 is configured to determine an outcome of the wagering-game instance at least partially in response to the random parameter.

In one embodiment, the gaming machine 10 and, additionally or alternatively, the external system 60 (e.g., a gaming server), means gaming equipment that meets the hardware and software requirements for fairness, security, and predictability as established by at least one state's gaming control board or commission. Prior to commercial deployment, the gaming machine 10, the external system 60, or both and the casino wagering game played thereon may need to satisfy minimum technical standards and require regulatory approval from a gaming control board or commission (e.g., the Nevada Gaming Commission, Alderney Gambling Control Commission, National Indian Gaming Commission, etc.) charged with regulating casino and other types of gaming in a defined geographical area, such as a state. By way of non-limiting example, a gaming machine in Nevada means a device as set forth in NRS 463.0155, 463.0191, and all other relevant provisions of the Nevada Gaming Control Act, and the gaming machine cannot be deployed for play in Nevada unless it meets the minimum standards set forth in, for example, Technical Standards 1 and 2 and Regulations 5 and 14 issued pursuant to the Nevada Gaming Control Act. Additionally, the gaming machine and the casino wagering game must be approved by the commission pursuant to various provisions in Regulation 14. Comparable statutes, regulations, and technical standards exist in other gaming jurisdictions. As can be seen from the description herein, the gaming machine 10 may be implemented with hardware and software architectures, circuitry, and other special features that differentiate it from general-purpose computers (e.g., desktop PCs, laptops, and tablets).

In at least some embodiments, the systems and methods described herein provide one or more game features including dynamic award symbols. More specifically, the award symbols are configured to provide one or more award values based one at least one dynamic game parameter such that the number and/or value of the award values associated with an award symbol are likewise dynamic. The dynamic game parameter may be a countable value such that the number and/or value of the award values are calculated at least partially as a function of the value of the dynamic game parameter. As a result, each award symbol may independently generate a plurality of award values to be aggregated and provided to the player, thereby increasing the number of awards presented to the player, which may increase excitement and engagement from the player. The award values in at least some embodiments are presented through text-based indication of the values rather than fanciful images and/or indicators attempting to link various symbols together, such as in line pays. Moreover, the determination of the plurality of award values according to the embodiments described herein result in computing efficiency of the underlying gaming systems in comparison to traditional line and/or scatter pays. That is, the awards resulting from the dynamic award symbols are determined through monitoring countable parameters and applying simple mathematical operations based at least in part on the monitored parameters, thereby resulting in a reduced computational complexity relative to the processes for scatter and line pays.

Figure 4:
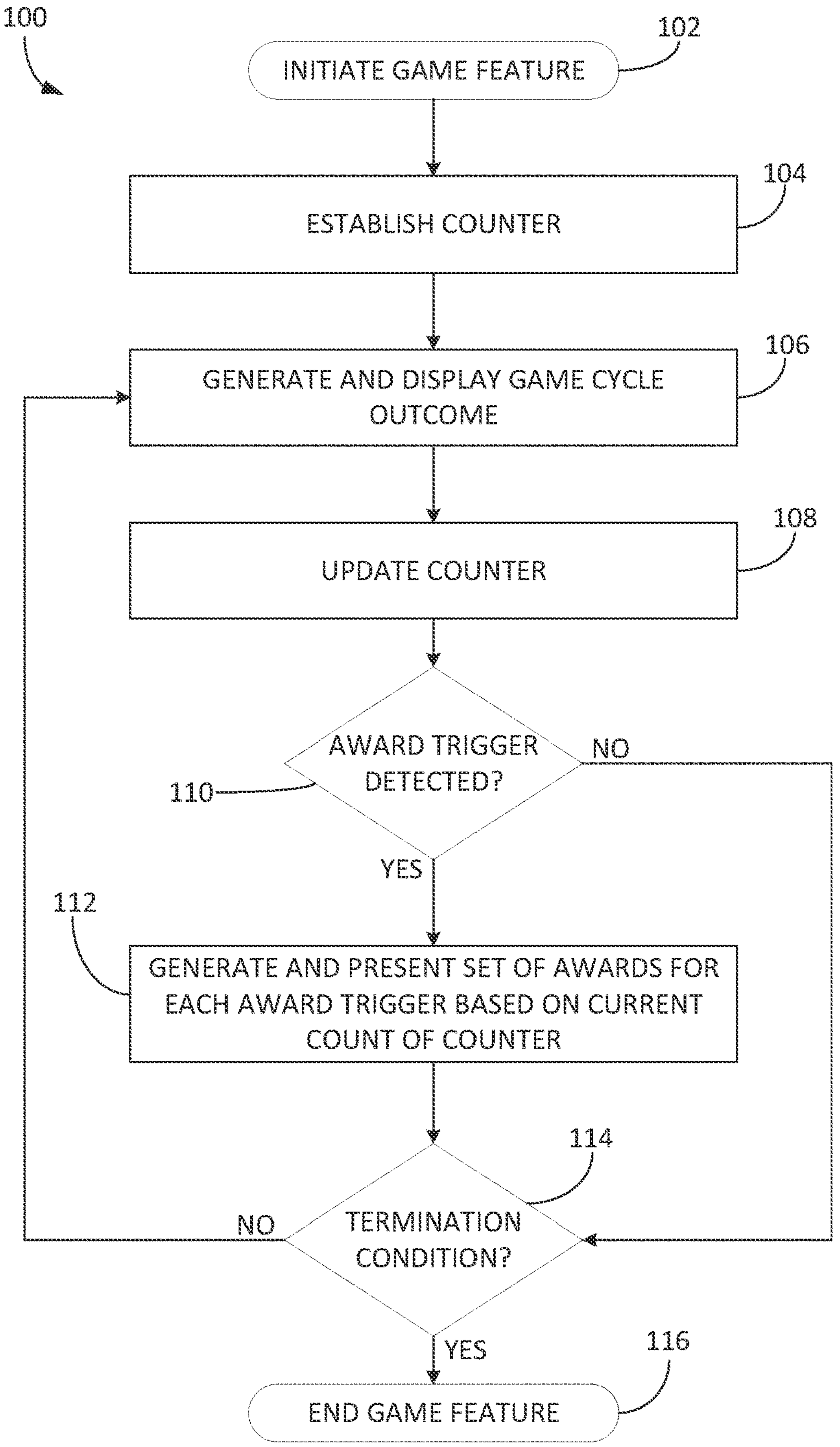
FIG. 4 is a flow diagram of an example method for a gaming system using dynamic award symbols, according to one or more embodiments of the present disclosure.

FIG. 4 is a flow diagram of an example method 100 for a dynamic award symbol game feature using a gaming system, such as the system shown in FIGS. 1 and 2. In the example embodiment, the method 100 is at least partially performed by game-logic circuitry and one or more display devices of a gaming machine (e.g., gaming machine 10, shown in FIG. 1). The game feature described herein is described as a bonus game feature, where the bonus game feature is initiated from a base or default game feature. In other embodiments, the game feature may be incorporated into a base game feature, performed by additional or other suitable devices of the gaming system, and/or the method 100 may include additional, fewer, or alternative steps, including described elsewhere herein.

At step 102, the game feature is initiated. In the example embodiment in which the game feature is a bonus game feature, the game feature is initiated in response to a trigger event occurring in another game feature, such as a base game feature (e.g., the feature shown in FIG. 3). The trigger event may be, for example and without limitation, a certain combination of symbols within a game outcome of the base game feature. The trigger event may include additional conditions to activate the bonus game feature, such as achieving wager thresholds, play time thresholds, and/or detecting a player account associated with the player. In other embodiments, the game feature is a base game feature or default game feature such that initiating a gaming session at the gaming machine initiates the game feature. In such embodiments, the game feature may be configured to facilitate other game features through trigger events like the trigger event of the example embodiment.

In the example embodiment, the game feature is a symbol array-based game feature, where symbol positions of a symbol array are populated with randomly-selected symbols to generate outcomes. The symbol array may be the same as or different from the array from the base game feature (e.g., having the same or different number of symbol positions). In some embodiments, the symbols are provided from a plurality of symbol-bearing reel strips, where each reel strip is associated with one or more symbol positions of the array. Based on one or more random determinations by the game-logic circuitry, the reel strips are animated to cycle through the available symbols before stopping to occupy the associated symbol position or positions with a respective symbol to generate the outcome. In other embodiments, the symbol array is populated using other suitable methods of randomly selecting symbols to generate the outcomes. Based on the outcomes, awards may be provided and/or other updates to the game feature are applied. For example, the game feature may have a limited duration, and each outcome updates the number of remaining spins or outcomes remaining. In certain embodiments, the game feature may be provided in non-array-based presentations, such as one or more segmented wheels bearing symbols and/or award values, where one of the wheel segments from each wheel is selected to generate the game outcome.

At step 104, the game-logic circuitry establishes one or more counters. The counters are variables that enable the game-logic circuitry to track events and/or other countable parameters associated with the game feature as described herein. In some embodiments, establishing the counters includes initializing the counters at a respective initial value (e.g., zero or null). The initialized counters are stored in memory for retrieval as updates are needed to the counters as described herein. In other embodiments, the counters are not initialized in response to initiating the game feature, but rather are established in response to game events as described herein. In such embodiments, the counter may be persistent through the game feature such that the same variable representing the counter is updated as described herein, or the counter may be non-persistent, where updates to the counter are performed by replacing the old counter with a new counter stored in memory such that the new counter may be stored in the same or different memory location as the old counter.

As used herein, the term "current count" refers the count or value stored by the counter. The current count at the establishment of the counter in step 104 is an initial value, such as zero. In other embodiments, the initial value of the counter may be another suitable value, such as a non-zero value for a counter configured to decrement towards zero. As described herein, the stored value representing the current count of the counter is updated in response to events associated with the game feature. For example, incrementing the counter from an initial value of zero by one causes the current count to be one. The current count and any predetermined values (e.g., the initial value) associated with the counter may be stored in memory to facilitate updates to the counter as described herein.

In at least some embodiments, the counter is persistent over a plurality of game cycle outcomes. That is, the current count of the counter is response to events or outcomes over a plurality of game cycles, such as a counter that increments or decrements after each game cycle outcome. In other embodiments, the counter is not persistent across game cycle outcomes, but rather is contained in counting game events or parameters for a single game cycle outcome. As a result, in such embodiments, the current count for a first game cycle outcome is replaced with the current count of a subsequent second game cycle outcome irrespective of the count from the first game cycle outcome.

In some embodiments, the counter is configured to track the spin or game cycle count. The spins or game cycles generate outcomes of the game feature (sometimes referred to herein as "spin outcomes" or "game cycle outcomes"). The counter may be configured to update in response to all or some game cycle outcomes (e.g., the counter only updates in response to game cycle outcomes including certain conditions, such as the presence or absence of a particular symbol). In other embodiments, the counter is configured to track the number of certain symbols appearing in one or more game cycle outcomes, the play time of the game feature or gaming session, a value associated with the position of symbols within the symbol array, and/or the like. In certain embodiments, several counters are established to track different values. In such embodiments, one, several, or all counters may be active at a time. Determining which counters are active or inactive may be based on, for example, player input, game events, and/or other suitable conditions or parameters of the game feature.

In at least some embodiments, the counter is visually presented within a game interface of the game feature on a display device of the gaming machine, thereby enabling the player to monitor the current count of the counter through the game outcomes. In other embodiments, the counter is not presented or is presented in response to certain events or conditions, such as the player achieving a winning outcome incorporating the counter as described herein.

At step 106, the game-logic circuitry generates a game cycle outcome and causes the display device of the gaming machine to present the game cycle outcome. Generating the game cycle outcome includes one or more random determinations that at least partially determine which symbols populate the symbol array (or determine other corresponding aspects of a non-array-based game feature). In some embodiments, one or more randomly-generated values are compared to a weighted table of outcomes or available symbols, where the random values are matched to a particular outcome or symbol to populate the array. In other embodiments, the random determination may be incorporated into other suitable known methods of generating game cycle outcomes. Based on the generated outcome, the display device is configured to present animations and/or other graphical elements to convey to the player a change in the array between adjacent outcomes. For example, the reel strips associated with the array may be animated to "spin" through the available symbols before stopping on the symbols identified within the generated outcome. Additional graphical elements and/or animations are presented in response to the outcome presentation to convey to the player any resulting actions or events from the outcome, such as awards.

In certain embodiments, the generation and presentation of a game cycle outcome may be untethered from each other due to relative speed at which the game-logic circuitry generates game cycle outcomes. That is, the game-logic circuitry may generate one or more game cycle outcomes irrespective of the presentation on the display device. For example, a free spins bonus game feature may not require any player input to progress, and therefore the game-logic circuitry generates the game cycle outcomes together and stores the outcomes to be presented sequentially at a pace suitable for a viewing experience by the player. Storing the generated game cycle outcomes in such a manner enables the game-logic circuitry to provide additional resources and focus on other tasks, such as retrieving the graphical resources for the display device to present the outcomes of the game feature. In other embodiments, such as embodiments in which player input between outcomes affect the subsequent outcome, generation and presentation of game cycle outcomes are tethered together such that the next game cycle outcome is not generated until the prior game outcome is presented.

In response to the game cycle outcome of step 106, the game-logic circuitry updates the counter at step 108. The update to the counter may be in response to events, symbols, and/or other parameters from the game cycle outcome, or the update may be irrespective of the particular game cycle outcome (e.g., the spin or cycle counter may increment or decrement in response to the outcome irrespective of the symbols within the outcome). As mentioned previously, the counter may be updated by storing a new value in a previously established variable stored in memory, or a new variable is stored to represent the new current count such that the old counter variable may be removed. In the illustrated embodiment, the update to the counter occurs prior to the determinations at steps 110 and 114 as described herein. In other embodiments, the update to the counter may occur in a different order to the determinations at steps 110 and/or 114 to impact when the current count changes and the effect of the current count as described herein.

At step 110, the game-logic circuitry determines whether or not an award trigger associated with the counter has been detected within the game-cycle outcome. In the example embodiment, the award trigger is the presence of one or more award symbols populating the symbol array in the game-cycle outcome. In certain embodiments, the award symbols are value-bearing symbols that each include award indicia to visually indicate an award value associated with the value-bearing symbol. For example, a value-bearing symbol may visually include text-based indicia to indicate the value-bearing symbol has a credit award value of '150'. In other embodiments, additional or alternative types of award symbols are included, and these award symbols may include additional functions beyond triggering the award sequence described herein. For example, one type of award symbol may be a wild symbol for use in determining line pays or scatter pays.

In the example embodiment, if the game-logic circuitry determines one or more award triggers are present from the game cycle outcome, the method 100 proceeds to one or more award sequences at step 112. Otherwise, if no award trigger is present, the game-logic circuitry continues resolve the game cycle outcome and prepare for any subsequent game cycle outcomes as described herein. It is to be understood that the award triggers described in step 110 are associated with the counters, and that other suitable award determinations and/or award sequences are performed to resolve the game cycle outcome. For example, the game-logic circuitry may be configured to determine line pays and/or scatter pays based on the symbols populating the symbol array and, in response to a winning outcome, present an award sequence associated with the winning combination (s). These award determinations and/or award sequences may be wholly separate from the determination and sequence of steps 110 and 112 as described herein or at least partially integrated. That is, the underlying computing instructions that the game-logic circuitry executes for determining awards and/or presenting the awards may include the functionality of steps 110 and/or 112 in combination with other similar award functions.

At step 112, in response to one or more award triggers associated with the counter, the game-logic circuitry initiates one or more award sequences for the award triggers. More specifically, for each award trigger, the game-logic circuitry generates a set of awards based on the current count of the counter and causes the display device of the gaming machine to present a corresponding award sequence by at least presenting the set of awards, where the set of awards are applied to a credit balance of the player. In one example, the counter tracks the current spin or game cycle count, and the award trigger is one award symbol populating the symbol array. In such an example, the set of awards generated for the award symbol is scaled to match the current game cycle count (e.g., on the fifth spin, the set of awards includes five award values), and the display device presents an animation sequence to present the set of awards in a manner visually linked to the award symbol and/or the symbol position occupied by the award symbol.

In some embodiments, the set of awards include randomly selected award values. The random selection may be from a range of award values or from a set of available award values. In certain embodiments, the award values are generated from one or more functions including at least one random number (i.e., from a random number generator). In other certain embodiments, the set of awards is generated by randomly selecting an aggregated award value and dividing the aggregated award value into the set of awards. The range or set of available award values may change depending on the number of award values within the set. That is, for example, the available award values may be different between a first set including three award values and a second set including five award values. Additionally or alternatively, the number of award values may alter weight parameters that affect the random selection. In other embodiments, the award values are predetermined. In further embodiments, a portion of the award values are predetermined, and another portion of the award values are randomly selected. For example, the first three award values may be predetermined while any additional award values are randomly selected.

In the example embodiment, the number of award values is scaled to match the current count of the counter. In other embodiments, other suitable functional relationships between the current count and the set of award values are used. In one example, the number of award values is inversely proportional to the current count (e.g., if the current count is three out of ten, the set of awards includes seven award values). In another example, the current count is compared to a stored table to determine the number of award values to include in the award set. In a further example, the current count is used in a mathematical function to generate the number of award values. In yet another example, the current count is used to determine the award values in addition to or instead of the number of award values within the set of awards. That is, in certain embodiments of such an example, the set of awards may have a predetermined number of award values, and the current count alters the value of one or more awards within the set.

In response to generating the set of awards, the game-logic circuitry causes the display device to present the award sequence to the player. That is, the display device is configured to present one or more animations, presentations elements, and the like to visually convey to the player each of the award values within the set of awards and apply the value of the set to a credit balance of the player. Other presentation devices of the gaming machine, such as speakers, lighting assemblies, and/or additional display devices may also be used by the game-logic circuitry to present the award sequence with the display device.

In some embodiments, the award sequence includes animations that present the set of awards in a manner that visually links the set with the award trigger, thereby enabling the player to readily identify the origin of the set of award values. For example, for embodiments in which the award trigger is the presence of an award symbol in the symbol array, the set of awards may be presented in a manner visually linked to the award symbol and/or the symbol position occupied by the award symbol. A plurality of suitable animations and presentation elements (including instructions and/or elements dedicated to presenting award values) that achieve the player recognition desired are considered as within the spirit and scope of the present disclosure.

In some embodiments, the award sequence includes presenting the award values of the set of awards sequentially. That is, an offset delay is added between each award value presentation, which may cause only one award value to be displayed at a time and/or enable the player to visually identify and distinguish between each award value, which is particularly beneficial for sets of awards having multiple awards of the same value. In one example, the award symbol is animated to reveal the award values in a sequential order. In other embodiments, award sequence includes presenting the entire set of awards together.

The order of the set of awards may be random (e.g., based on the random determinations for generating the set) or based on one or more presentation rules. In one example, the set of awards is organized in an order of increasing award value such that the award having the highest value appears last. In another example, multiple awards having the same value may be mixed between other award values to help aid the player in recognizing the different award values. In a further example with a set of awards including predetermined values and generated values, the set may be organized to order the predetermined values first and the generated values afterwards.

In the example embodiment, each award trigger detected at step 110 has a separate set of award values and award sequence in step 112. That is, if multiple award symbols are present in a game cycle outcome, a separate set of awards is generated and presented for each award symbol. In certain embodiments, the number of award triggers in a given game cycle outcome alters or affects the number and/or value of awards within the respective award sets. In one example, the number of predetermined award values within each set may increase or decrease based on the number of concurrent award triggers. In another example, the range or set of available award values may be changed based on the number of concurrent award triggers. The award sequences for each award trigger occur in parallel to each other or are organized to enable the player to focus on each award sequence. In certain embodiments, the award sequences are interlaced or otherwise combined to form one or more aggregated award sequences. For example, one award value of each set may be presented simultaneously such that the award sequences are synchronized together.

The counter-based awards and corresponding award sequences represent technical improvements to gaming systems and gaming presentation. More specifically, the game feature associated with the method 100 generates sets of awards for each award trigger (including simultaneously occurring award triggers) and presents the sets of generated awards in a unique manner readily identifiable by the player such that each award may distinguished from other awards and may be linked to the corresponding award trigger. The awards are generated through functions unlike traditional award determinations that compare all of the combinations of symbols within the symbol array to one or more lookup tables of winning outcomes and the provided wager to generate awards. More specifically, the game feature described herein generates a plurality of award values without regard of symbol combinations, thereby reducing the computing resource burden on the gaming machine to determine and present the award sequences.

In the example embodiment, the game-logic circuitry determines whether or not a termination condition is present in response to steps 110 or 112. In such embodiments, the game feature has a limited duration, and the termination condition is used to determine whether or not to continue or conclude the game feature. The termination condition may include, for example, expiration of a number of game cycle outcomes, collecting or failing to collect a certain number of a particular type of symbol, player input to initiate the termination condition, and/or other suitable conditions or events associated with terminating the game feature. In some embodiments, the termination condition is based on the current count of the counter. That is, a predetermined termination value is stored for the counter, and the current count is compared to the termination value at step 114 to detect the presence or absence of the termination condition. Depending upon the specific configuration of the counter (e.g., the trajectory of the count, when the count is updated, etc.), matching or passing by the termination value is the termination condition. In one example, the counter is configured to count ten game cycle outcomes, and expiration of the ten game cycle outcomes based on the current count of the counter is the termination condition for the game feature.

If the termination condition is not present at step 114, the game feature continues at step 106 to generate and present another game cycle outcome and repeats steps 108-114. If the termination condition is detected, then the game feature is concluded at step 116. Concluding the game feature in the example embodiment causes the game to resume the base game feature, where play continues until to the gaming session is concluded or the game feature associated with the method 100 is triggered again. In other embodiments, particularly embodiments in which the game feature is a base game feature, the gaming session may be concluded at step 116 by initiating a payout sequence. The payout sequence includes providing any non-zero credit balance to the player through one or more physical items (e.g., coins, bills, tickets, cards, etc.) provided by the gaming machine and/or adding the credit balance to a digital wallet or account associated with the player.

In certain embodiments, the termination condition does not result in concluding the game feature, but rather causes one or more aspects of the game feature to be reset. That is, in place of ending the game feature at step 116, the counter and/or other aspects of the game feature is reset to a respective initial state or reset state to continue the game feature. For example, the current count of the counter may be reset to the initial value to continue the game feature. Accordingly, the termination conditions may be reset conditions in certain embodiments. In these embodiments, separate reset conditions and termination conditions may be associated with the game feature such that a separate determination for resetting the game feature is present within the method 100.

FIGS. 5A-5G depict a game interface 200 for an example game feature according to one or more embodiments of the present disclosure. The game interface 200 is presented by one or more display devices of a gaming machine based on computer-readable instructions executed by game-logic circuitry. FIGS. 5A-5G depict the game interface 200 through a plurality of states for awarding a plurality of awards associated with a single award trigger. In other embodiments, the game interface 200 includes additional, fewer, or alternative presentation elements and/or animations, including those described elsewhere herein. For example, changes to the underlying game feature may result in corresponding changes to the game interface 200.

Figure 5A:
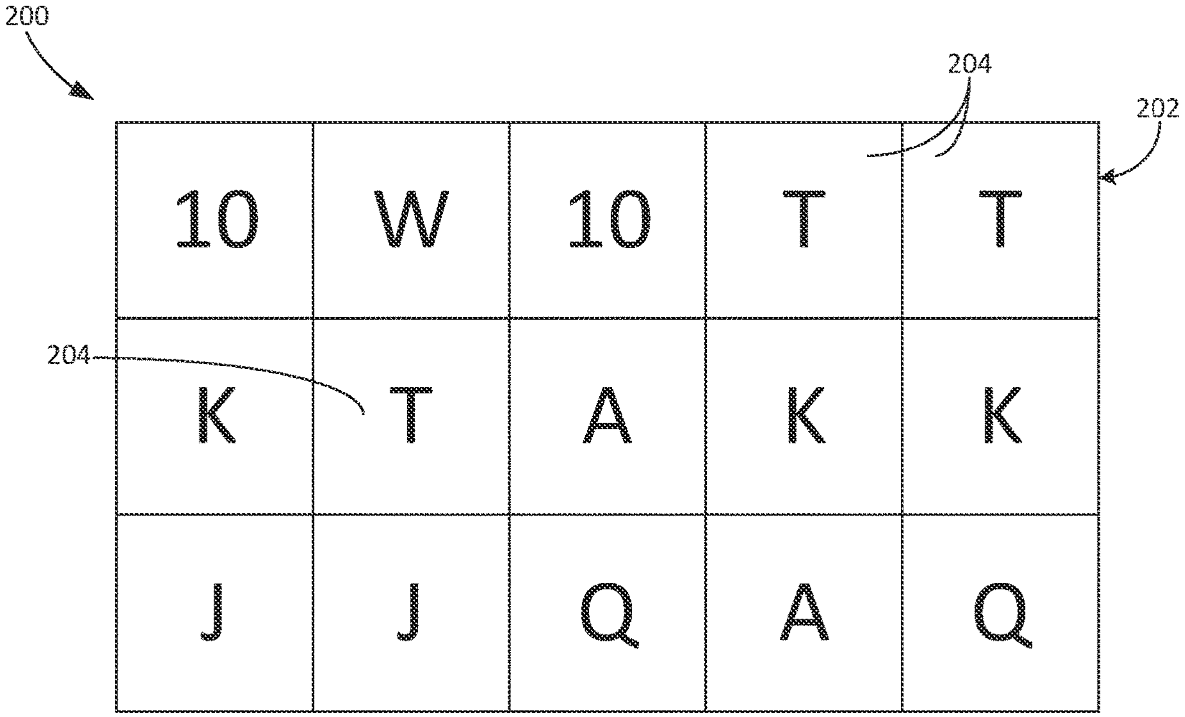
FIG. 5A is an example game interface of a gaming system in a trigger state, according to one or more embodiments of the present disclosure.

FIG. 5A depicts the game interface 200 at a trigger state. More specifically, a base game feature (e.g., the feature shown in FIG. 3) is being conducted a trigger event is detected from the base game feature. In the example embodiment, the interface 200 includes a symbol array 202 that is selectively populated with symbols. In the illustrated trigger state, the symbol array 202 includes three trigger symbols 204 (denoted as a 'T' symbol in FIG. 5A), and an outcome including three or more trigger symbols 204 initiates a bonus game feature. In at least some embodiments, the game-logic circuitry saves or otherwise stores the state of the base game feature prior to initiating the bonus game feature to enable the base game feature to resume back in the trigger state following conclusion of the bonus game feature as described herein. In other embodiments, the state is not saved for subsequent use.

Figure 5B:
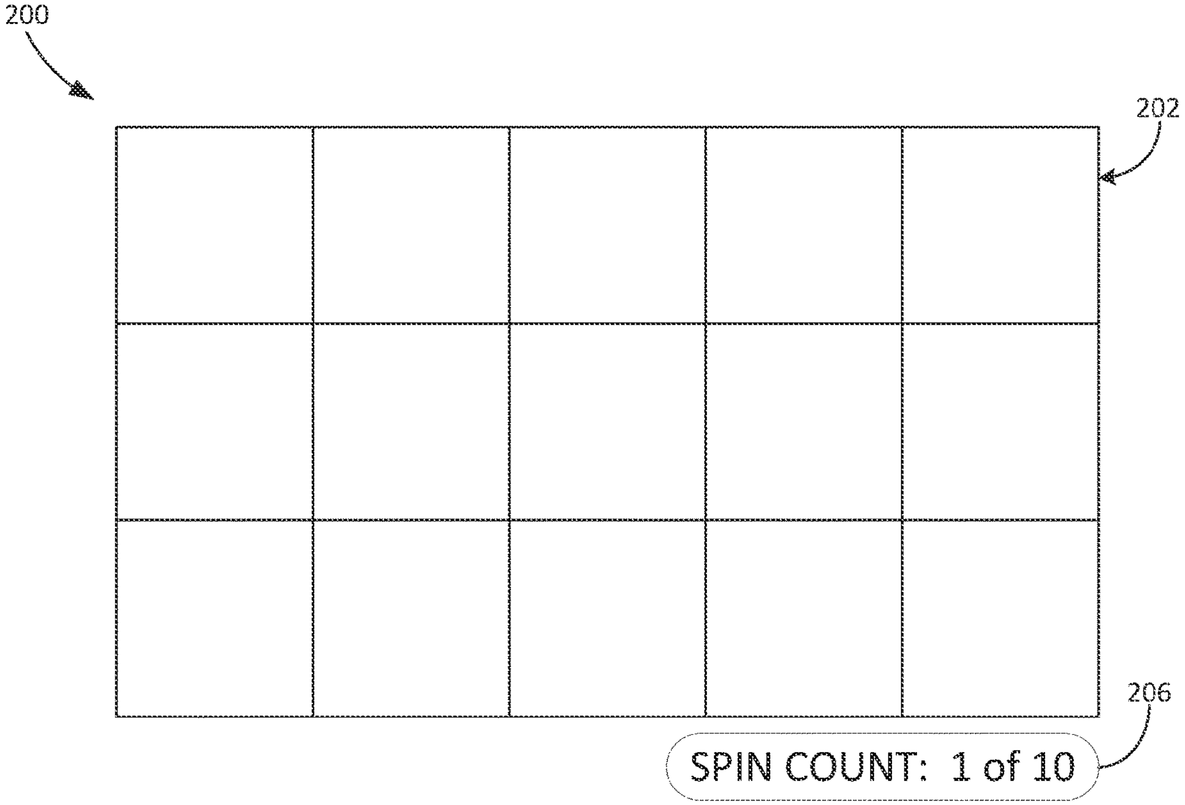
FIG. 5B is the game interface of FIG. 5A in a first state of a bonus game feature, according to one or more embodiments of the present disclosure.

FIG. 5B depicts the game interface 200 in an initial state of the bonus game feature following the trigger state shown in FIG. 5A. In the example embodiment, the symbol array 202 remains the same between the base game feature and the bonus game feature. That is, the symbol array 202 has the same number of symbol positions in the same number of rows and columns between the two game features. In other embodiments, the symbol array 202 may change to expand, contract, or otherwise reorganize the symbol positions (including configurations that divide the symbol positions into a plurality of separate subarrays). In the example embodiment, the symbols from the trigger state are removed from the array 202 for the bonus game feature. In other embodiments, the symbols remain. It is to be understood that the empty symbol positions in FIGS. 5B-5G may be occupied by symbols in some embodiments. These symbols may be factored into aspects of the bonus game feature (e.g., awarding payouts similar to the payouts described with respect to FIG. 3) or may be inactive. The inactive symbols may be visually distinguished from the active symbols of the bonus game feature as described herein. For example, the inactive symbols may be translucent, greyed out, and/or other suitable visual distinctions from active symbols.

In the initial state, a spin counter 206 is initiated and presented within the game interface 200. The spin counter 206 tracks the duration of the bonus game feature. In the example embodiment, reaching the end of the duration as indicated by the spin counter 206 (i.e., ten spins or game outcomes) causes the bonus game feature to end. In other embodiments, the bonus game feature may be reset or changed at the conclusion of the duration rather than concluding. For example, in some embodiments the bonus game feature is a base game feature, and concluding the duration causes the game feature to be reset as described herein.

In the example embodiment, the spin counter 206 is expressed as the current spin or game cycle out of the termination count (i.e., ten). In other embodiments, the spin counter 206 is expressed as the remaining number of spins (e.g., ten out of ten spins remaining). In some embodiments, the counter 206 may not count spins or game outcomes, but rather monitors the count of other game events or game conditions. For example, the counter 206 may track the presence or absence of certain symbol types within the game outcomes.

To generate each game outcome of the bonus game feature, the game-logic circuitry causes the display device to selectively populate the symbol array 202 with symbols. In some embodiments, the array 202 is selectively populated with none, one, or a plurality of symbols as described herein. In certain embodiments, each symbol position is occupied by a symbol, but some or all of the symbols are inactive (i.e., do not affect the outcome determination of the bonus game feature). In response to the active symbols occupying the array 202 for each game outcome, the game-logic circuitry provides awards and/or performs other outcome-based determinations, including those described herein.

Figure 5C:
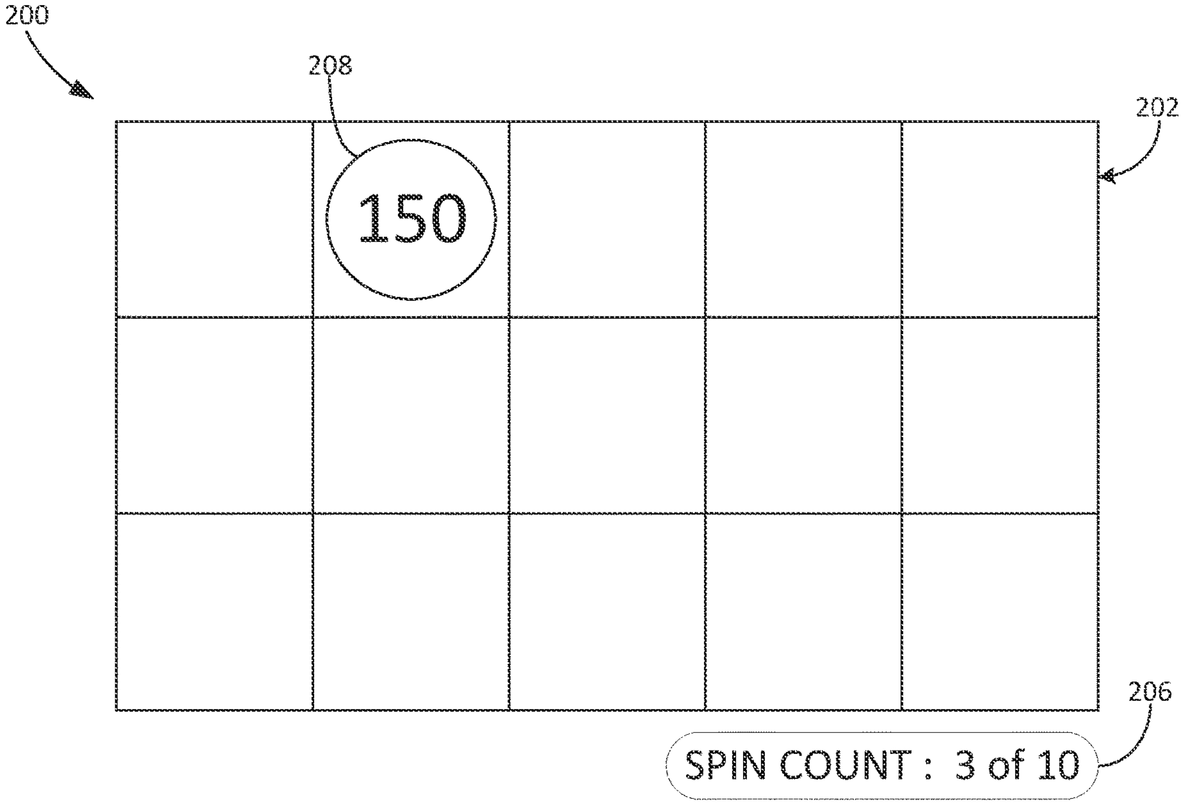
FIG. 5C is the game interface of FIG. 5A in a second state of a bonus game feature, according to one or more embodiments of the present disclosure.

FIG. 5C is a second state of the bonus game feature depicting the third game outcome. In the second state, a value-bearing symbol 208 occupies the symbol array 202. The value-bearing symbol 208 includes award indicia (i.e., "150") that visually indicates the award value associated with the value-bearing symbol 208. In other embodiments, additional or alternative value indicia may be included with the value-bearing symbol 208. In further embodiments, the symbol 208 does not initially include value indicia, but rather the value indicia is presented through the steps and animations described herein.

In the example embodiment, each value-bearing symbol 208 within the array 202 triggers a bonus award sequence in which one or more award values are provided to the player. In other embodiments, the bonus award sequence is trigger in response to additional or alternative game conditions or game events. For example, the trigger may include detecting certain combinations of symbols, a certain threshold number of symbols, and the like. Each instance that triggers the bonus award sequence is independent from the other instances such that multiple bonus award sequences can be triggered on the same game outcome. That is, if another value-bearing symbol was present in the array 202 in the example embodiment, two bonus award sequences for the value-bearing symbol 208 and the other symbol would be triggered in the second state.

In the bonus award sequence, one or more awards are provided to the player for the value-bearing symbol 208. More specifically, the number of awards to be provided are at least partially a function of the current count of the counter 206. In the example embodiment, the number of awards provided is equal to the current count of the counter (in the illustrated embodiment in FIG. 5C, the number of awards would be three). In another example, the number of awards provided is the duration of the bonus game feature minus the current count (e.g., duration of ten minus the current count of three, which equals seven). In other embodiments, other suitable mathematical and/or logical operations are performed to determine the number of awards. In one example, a table stored by the game-logic circuitry links each possible count of the counter 206 to a respective number of awards. In certain embodiments, one or more random and/or dynamic elements (e.g., based on the game events and/or conditions) are included in the award determination such that award sequences for the same current count may yield a different number of awards.

In certain embodiments, the possible number of awards may include zero in which no award is provided for a given trigger. In such embodiments, the zero awards may be provided for a trigger randomly or in response to a game event or condition, such as outcomes with a plurality of concurrent triggers. If the outcome includes more than a maximum number of triggers (e.g., one, two, five, etc.), then any remaining triggers may be automatically set to provide no award, or certain sets of awards may be removed. To determine which set of awards to remove or set to zero, the game-logic circuitry may compare the aggregate award value of each set to each other, refer to a predetermined hierarchy of determination (e.g., left-to-right, top-to-bottom analysis of the array 202), and/or incorporate random outcomes.

The bonus award sequence includes presentation elements and/or animations to present the plurality of awards to the player in a manner in which the player recognizes each award and the trigger for the bonus award sequence. In the example, embodiment, the value-bearing symbol 208 is configured to present new award indicia for each award of the set of awards. In other embodiments, the awards are presented through additional and/or alternative presentations, such as a dedicated graphical element within the interface 200 for presenting award sets.

Figure 5D:
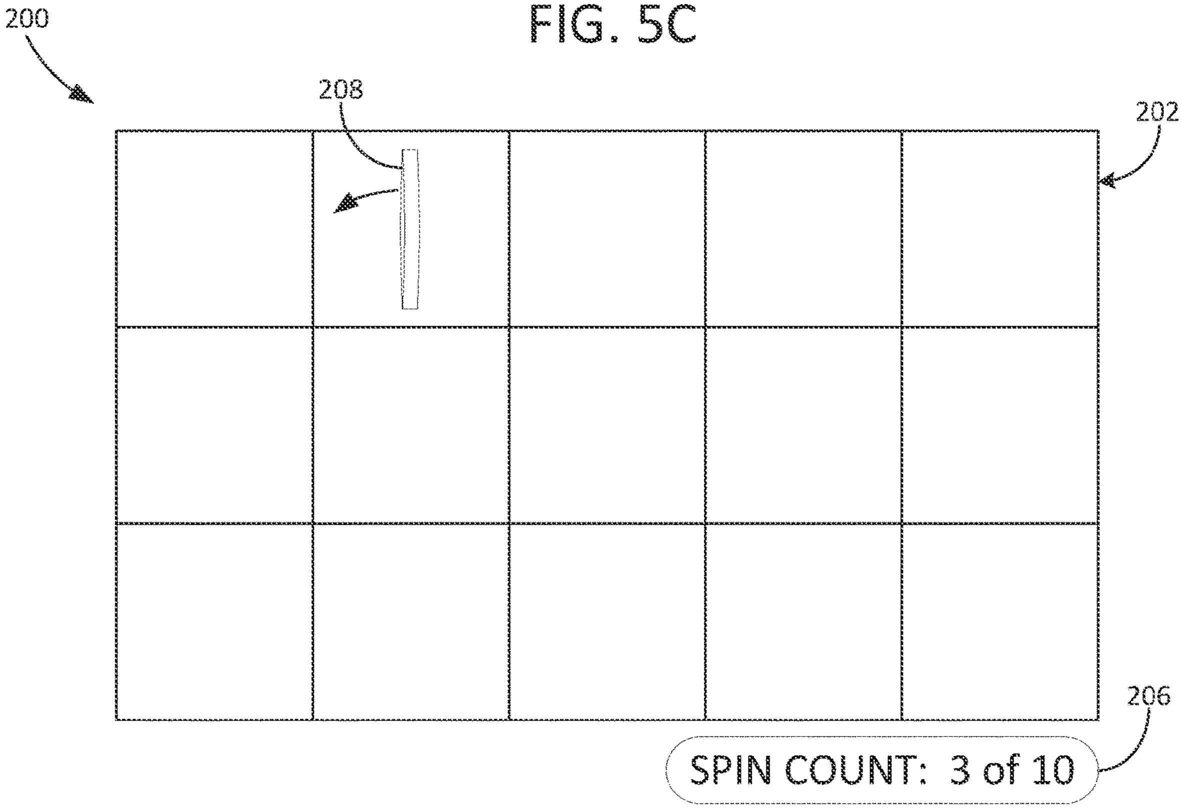
FIG. 5D is the game interface of FIG. 5A in a third state of a bonus game feature, according to one or more embodiments of the present disclosure.

FIG. 5D depicts the game interface 200 in a third state during the bonus award sequence triggered by the presence of the value-bearing symbol 208 in the second state. In the example embodiment, the set of awards is determined to include three awards based on the current count indicated by the counter 206. While the first award was presented as the initial award indicia in FIG. 5C, the two remaining award values of the set are presented sequentially. Although the example given herein presents each award value separately, it is to be understood that prior award values may persist on the game interface 200 or that the presentation of one award value may begin while at least the immediately prior award value is still being presented. As the award indicia of the award values persist on the game interface, the display device may be configured to alter the presentation of the award indicia to enable the player to readily distinguish between previously presented values and the latest award value. In one example, the award indicia move away from the value-bearing symbol and may change visual characteristics, such as color and/or transparency.

In the example embodiment, the value-bearing symbol 208 is animated to "flip" similar to a coin, where the hidden "face" is revealed with new award indicia. FIG. 5D depicts the value-bearing symbol 208 within the animation. In certain embodiments, the initial award indicia may persist within the game interface 200 at another suitable location such that the player can visually see the set of awards as a whole following the animations described herein. It is to be understood that other animations that reveal the set of awards in a manner that enables the player to distinguish each award value within the set are considered to be within the spirit and scope of the present disclosure, including those animations described elsewhere herein (e.g., FIGS. 7 and 8).

Figure 5E:
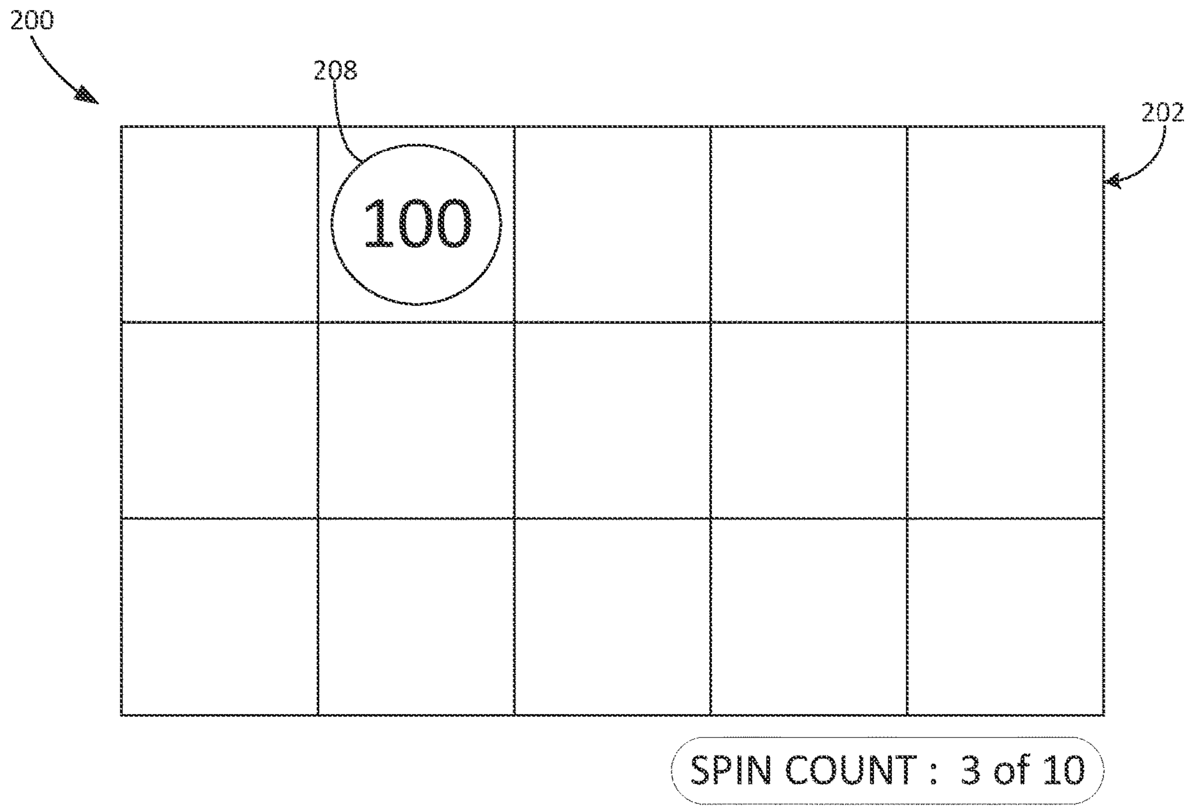
FIG. 5E is the game interface of FIG. 5A in a fourth state of a bonus game feature, according to one or more embodiments of the present disclosure.

FIG. 5E depicts the game interface 200 in a fourth state immediately following the third state. At the fourth state, the value-bearing symbol 208 has completed the animation to present updated award indicia representing the second of three award values within the set of awards. In the example embodiment, the first award value was "150," while the second award value is "100." Each value within the set of awards may be predetermined, dynamically determined, or at least partially random. In one example, the values are equal to the initial award value of the value-bearing symbol 208. In another example, the values are selected from a predetermined table of award values, where each award value is selected based on the number of award values determined for the value-bearing symbol 208. For dynamically determined values, the value of each award may be based on the initial award value (e.g., each successive award increases or decreases in value), other award values, and/or other game events or conditions. Randomly determined values include values at least partially randomly selected from a set or range of available award values. In certain embodiments, weighting parameters may be used to influence the probability of certain values occurring for each award. In such embodiments, the weight parameters may be adjusted for each award and/or based on the number of awards within the set.

In the example embodiment, the values of the set of awards are at least partially randomly determined. The order of the values is based on the order of determination or generation of the values. In other embodiments, the order of the award values may be adjusted to present the award values in an order that increases or decreases in value. Other suitable configurations of ordering the set of award values may be used.

Figure 5F:
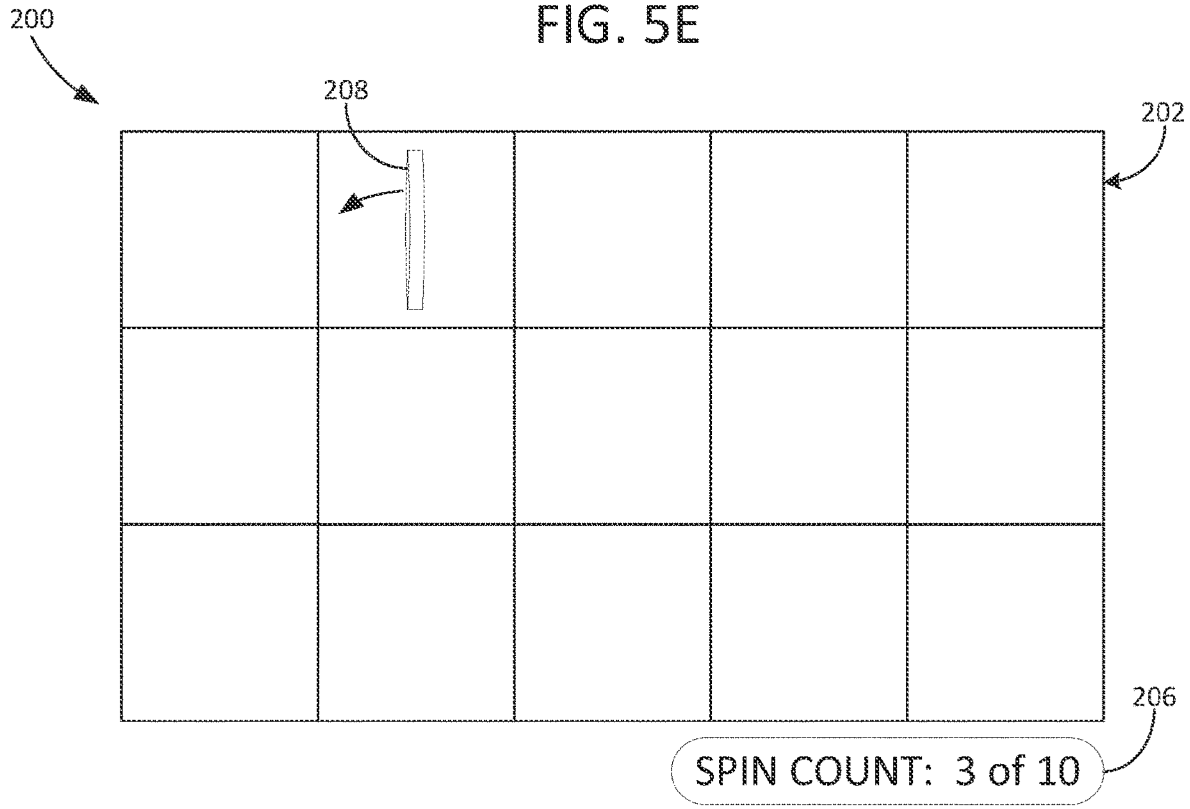
FIG. 5F is the game interface of FIG. 5A in a fifth state of a bonus game feature, according to one or more embodiments of the present disclosure.

FIG. 5F depicts the game interface 200 in a fifth state following the fourth state. In the fifth state, the value-bearing symbol 208 is animated to flip to the final award value of the set. The animation may be the same as the animation described in the third state, or a different animation may be used. Although the transitions between the third, fourth, and fifth states have been described together, it is to be understood that the fourth state (and other similar states) may persist for a period of time to enable the player to recognize the new award indicia of the value-bearing symbol 208. The delay in transitioning to the fifth state may be predetermined (e.g., one or two seconds), or the delay may be controlled by the player (e.g., the player is prompted to provide input to advance the bonus award sequence).

Figure 5G:
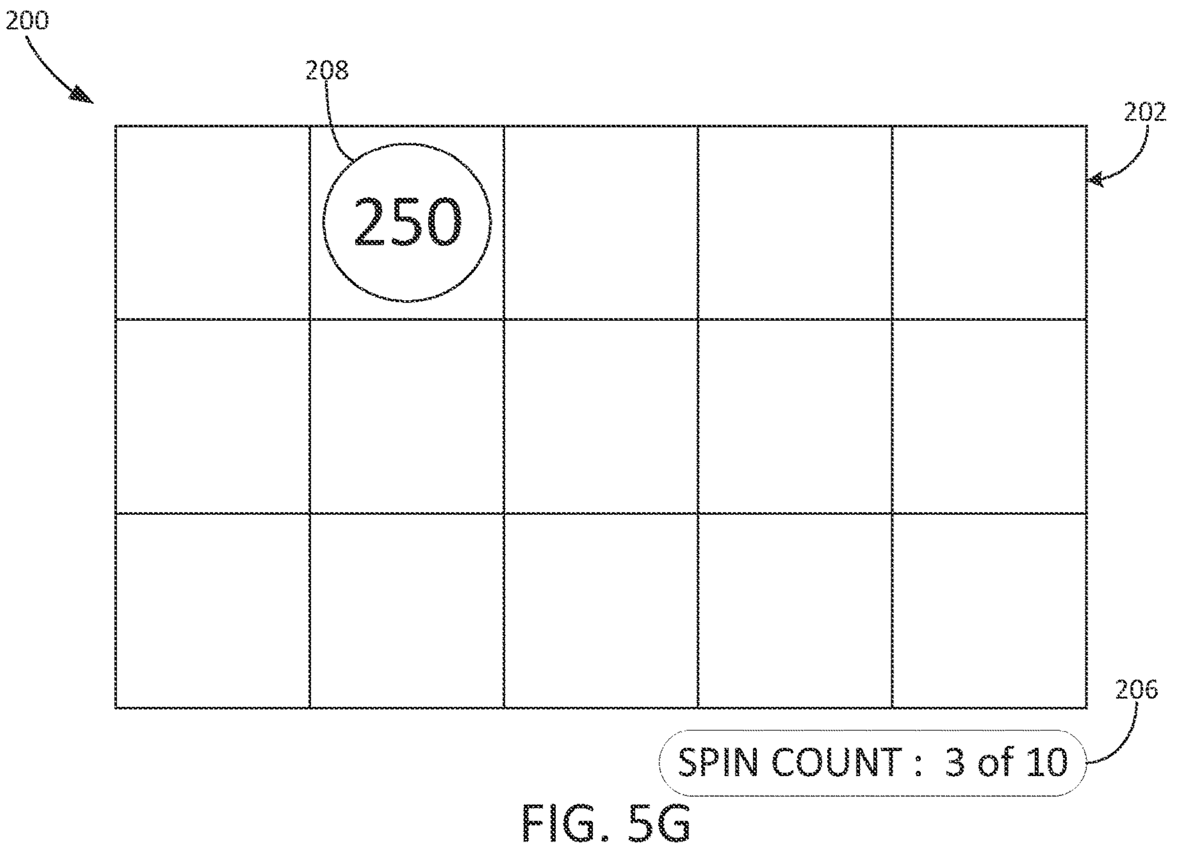
FIG. 5G is the game interface of FIG. 5A in a sixth state of a bonus game feature, according to one or more embodiments of the present disclosure.

FIG. 5G depicts the game interface 200 in a sixth state following the fifth state. In the sixth state, the value-bearing symbol is updated to include award indicia for the final award value of the set of awards. In some embodiments, each award value is credited to the credit balance of the player in response to being presented on the interface 200. In other embodiments, the award values of the set are aggregated into an aggregate award value presented on the game interface 200 prior to being provided to the credit balance of the player. Following the updates to the credit balance, the bonus game feature continues by updating the counter 206 and selectively populating array 202.

Although the example provided above includes initiating the bonus award sequence immediately in response to an award trigger, some embodiments may delay the bonus award sequence. In one example, the value-bearing symbol 208 is locked within the symbol array 202, and the game-logic circuitry stores the current count at which the symbol 208 first occupied the array 202. In this example, at the conclusion of the bonus game feature, the bonus award sequence for each lock symbol is initiated based on the respective stored count such that the bonus award sequences are present in parallel. These embodiments may be used to limit the number of bonus award sequences that can be triggered as no additional symbols can occupy the space of the locked symbols.

Figure 6:
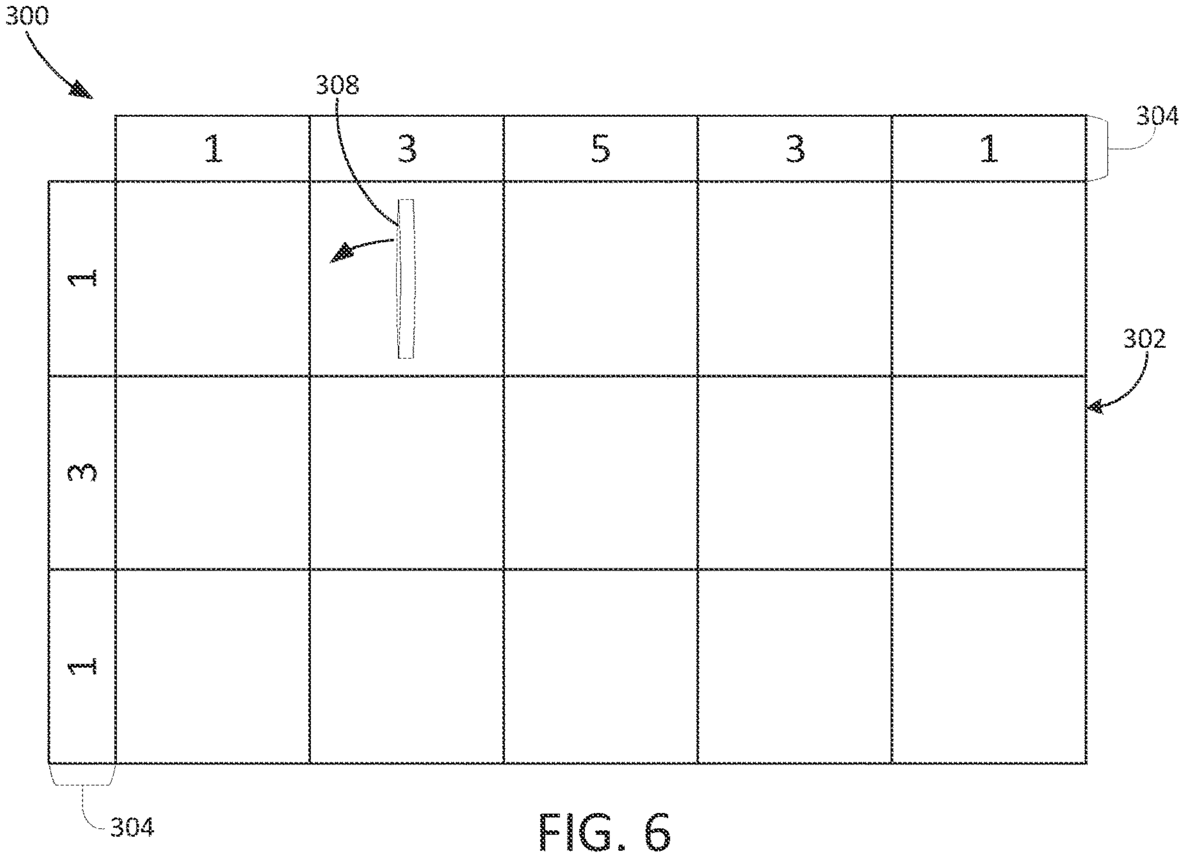
FIG. 6 is an example game interface for a game feature including position-based count indicators, according to one or more embodiments of the present disclosure.

The embodiments above include the use of a spin or game outcome counter. However, in other embodiments, other counts may be used. In one example, the number of symbols within a particular game outcome may determine the current count. In another example, each symbol position may be associated with a count. FIG. 6 depicts an example game interface 300 with a symbol array 302. The game feature associated with the game interface 300 is similar to the game feature described with respect to FIGS. 5A-5G, but instead of a spin counter, the game interface 300 includes a plurality of count indicators 304.

The count indicators 304 visually identify a value or count that is associated with the corresponding row or column of the array 302. In other embodiments, each symbol position may include a count indicator 304. The count indicator is not limited to a text-based value but may be additionally or alternatively other visual aspects from which a corresponding value is linked to.

In some embodiments, the count indicators 304 are predetermined and/or static values for the duration of the game feature. In other embodiments, the count indicators 304 may be dynamic such that the value associated with each symbol position changes over the course of the game feature.

In the example embodiment, a value-bearing symbol 308 that lands in a symbol position triggers the bonus award sequence, which is similar to the sequence described with respect to FIGS. 5C-5G. However, the current count is determined from the count indicators 304 associated with the symbol position of the value-bearing symbol 308. In the illustrated example, the count indicators 304 associated with the symbol 308 are one and three. In some embodiments, the aggregated count (i.e., four) is the current count used for the bonus award sequence. In other embodiments, one of the two count indicators 304 is selected to be the current count, or other suitable means of determining the current count from the associated count indicators 304 are used. For example, the associated count indicator 304 having the highest value may be used as the current count (i.e., three). The presentation of the set of awards may then be similar to the presentation described in the foregoing embodiments of the present disclosure as seen by the flipping animation of the symbol 308.

Figure 7:
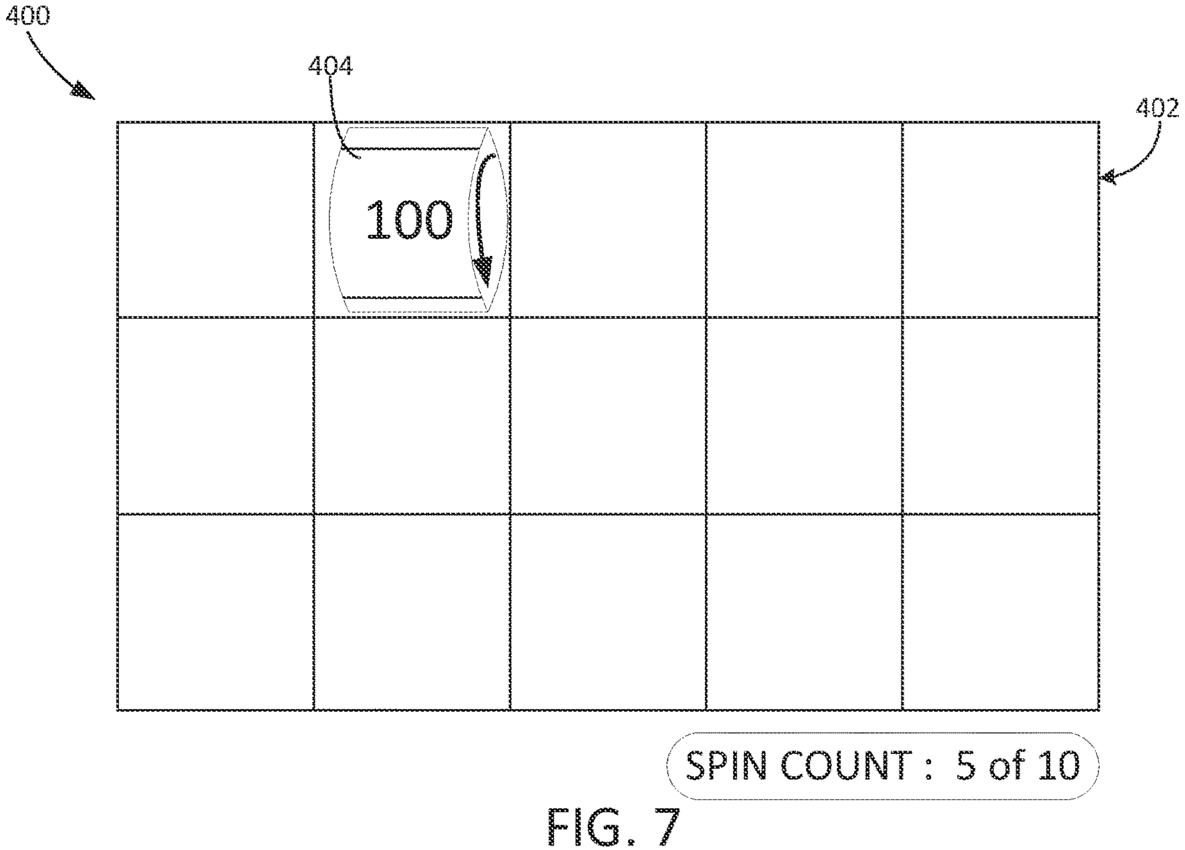
FIG. 7 is an example game interface for a game feature including a reel-based presentation of a bonus award sequence for a set of awards, according to one or more embodiments of the present disclosure.

In certain embodiments, other suitable animations and/or presentation elements are used to present the set of awards. FIG. 7 depicts a game interface 400 similar to the other game interfaces described herein for a game feature associated with the method 100 (shown in FIG. 4). While the underlying determinations by the game-logic circuitry may the same or similar to other embodiments, the presentation of the set of awards is different from a flipping coin or symbol.

In the illustrated embodiment, the game interface 400 includes an array 402. Within the array 402, an award reel strip 404 is shown. The award reel strip 404 may act similar to the value-bearing symbols described previously or replace a value-bearing symbol in response to the bonus award sequence being triggered. The reel strip 404 is configured to include a plurality of award values, and the reel strip 404 is animated to spin, thereby presenting the various award values of the reel strip 404 to the player before landing on one of the values determined for the set of awards. The reel strip 404 may then continue to spin and stop for each award value of the set before concluding. Other presentations, such as segmented award wheels, may be used in place of the reel strip 404.

Figure 8:
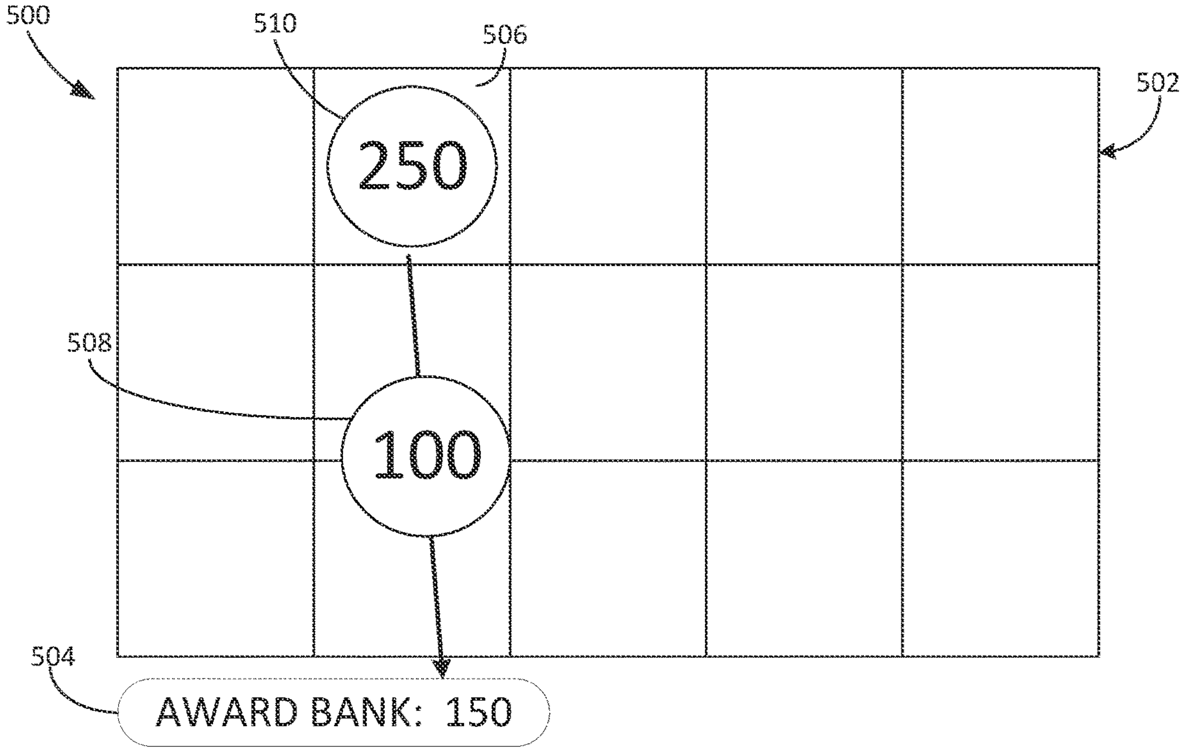
FIG. 8 is an example game interface for a game feature presenting a bonus award sequence animation, according to one or more embodiments of the present disclosure.

As discussed above, for sets of award values having a plurality of values, the values may visually persist over the bonus award sequence to enable the player to have sufficient time to identify each of the awards. FIG. 8 depicts an example game interface 500 including an array 502 similar to the arrays shown in FIGS. 5A-7. In addition to the array 502, the interface 500 includes an award bank 504. The award bank 504 is configured to record the aggregate award value of the set of awards to be provided to the player for a given bonus award sequences. The award indicia of the award bank 504 is animated to update in response to the animations of the value-bearing symbol(s) described herein.

In the example embodiment, a bonus award sequence has been triggered via a value-bearing symbol at symbol position 506. Unlike other embodiments in which the value-bearing symbol is animated to flip through each award value of the associated set of awards, the embodiment shown in FIG. 8 presents a new value-bearing symbol for each award of the set of awards. In this example, the set of awards includes at least a first value-bearing symbol 508 and a second value-bearing symbol 510. The bonus award sequence includes animations that cause the value-bearing symbols to move to the award bank 504, thereby cause the value indicated by the award bank to be adjusted based on the value of each symbol. As a result, the first value-bearing symbol 508 previously was presented within the symbol position 506 such that the second value-bearing symbol 510 was hidden from the game interface 500. The first value-bearing symbol 508 was then animated to move towards the award bank as indicated by arrow 512. In response to the first value-bearing symbol 508 approaching the award bank 504, the award indicia of the award bank 504 is updated to include the value from the first value-bearing symbol 508 (i.e., the 150 in the bank 504 is updated to 250), and the first value-bearing symbol 508 is removed from the game interface 500.

When the first value-bearing symbol 508 moves, the second value-bearing symbol 510 is revealed to the player. Like the first value-bearing symbol 508, the second value-bearing symbol 510 is animated to move towards the award bank 504 to increase the value presented by the award bank 504. The display devices may be configured to delay the movement of the second value-bearing symbol 510 to provide the player time to see the change to the award bank 504 from the first value-bearing symbol 508 and/or to identify the award value of the second value-bearing symbol 510.

Any subsequent awards in the set of awards may be presented in the same or similar manner as the first and second value-bearing symbols 508, 510. In response to collecting the aggregate award value in the award bank 504, the aggregate award value may be provided to the credit balance of the player. In certain embodiments, the award bank 504 may be configured to store additional value from other bonus award sequences such that the application of the aggregate award value to the credit balance is delayed to accommodate the other bonus award sequences. In one example, the award bank 504 is not applied to the credit balance until the conclusion of the bonus game feature. In certain embodiments, a presentation element representing the credit balance includes the functionality of the award bank 504 as described herein such that the award values from the bonus award sequences are directly applied to the credit balance.

It is to be understood that the animations and presentation described with respect to FIG. 8 are for exemplary purposes only and are not intended to limit the present disclosure to the particular animations and presentation described above. Rather, other suitable animations (including animations in which the value-bearing symbols 508, 510 are simultaneously presented and/or applied to the award bank 504) and presentation configurations that enable the player to readily identify each award of the set of awards is considered to be within the spirit and scope of the present disclosure.

Although the foregoing embodiments from FIGS. 4-8 are described in relation to bonus game features, it is to be understood that the game features may also be incorporated into play of a base game feature. The game feature may include variations, particularly to the trigger and termination conditions, to facilitate the use in abase game. Moreover, the foregoing game features may not be limited to wagering games, but rather may also be used in casual games. In such casual games, the awards and credits may not have monetary value, and are used to fund the duration of the game, purchase digital items having no monetary value, and/or other similar uses.

In the embodiments disclosed herein, each value-bearing award symbol may be assigned a credit value that is displayed upon the symbol. The credit value may, for example, range from a minimum credit value to a maximum credit value and be based on the total amount wagered on the game. For example, if a player wagers a minimum of 100 credits, the assigned credit value may range from 100 to 1000 credits. And if a player wagers a maximum of 500 credits, the assigned credit value may proportionately increase and thereby range from 500 to 5000 credits. In some embodiments, the assigned value may be randomly selected from a list of possible multipliers of the total amount wagered on the game, for example, 1×, 2×, 3×, 4×, 5×, 10×, 15×, 20×, 50×, and 100×. In other embodiments, the value may be pre-assigned to each value-bearing award symbol as part of the reel strip layouts of the game reels. In still other embodiments, the assigned value may be randomly selected before, during, or at the conclusion of a reel spin.

In at least some of the embodiments herein, awards may be provided for each game outcome based on at least the remaining symbols. For example, line pays and scatter pays may be awarded for each game cycle outcome based on the symbols populating the symbol array. In some embodiments, the value-bearing award symbols may not be associated with awards outside of the features described herein. In other embodiments, the award symbols may be included within line pays, scatter pays, and/or other suitable awards. For example, the award symbols may be treated as a special symbol, such as a wild symbol.

The embodiments of the present invention provide innovative procedures for generating and presenting a set of award values for independent award symbols. Game-logic circuitry executing instructions in accordance with the embodiments present a visual display of spinning reels with clearly enumerated symbology that combine in readily understood arrangements to increase in value. An observer experiences excitement and anticipation as new symbols land in the array and the set of award values are displayed. In stark contrast to conventional reel-spinning games in which symbol images are evaluated for winning combinations by paytable rules, the disclosed embodiments provide immediately recognizable values in WYSIWYG display configurations while adding variability as to how the values to be awarded to the player are selected and accumulated.

The dynamic award symbol procedures may be symbol- and game-agnostic. Themes and imagery of symbols and environment may be varied with no effect on the value-aggregation and dynamic award symbol processes. Or, if so desired, the criteria for the dynamic award symbol processes may be modified in innumerable ways to produce new visual/animation effects and exciting summation sequences.

Further benefits are realized in increased computer processing efficiency, fewer rules to be evaluated, and simpler graphical representations. For example, in a conventional paytable evaluation, overlapping payline sections require multiple evaluation steps. Often, analysis is required to determine which payline results in the highest credit total, with the lesser value paylines being discarded but only after being evaluated-all this adds to processing overhead. Special symbols like wilds, multipliers, and scatter symbols can modify paytable values and may require separate, additional evaluation according to customized rule sets. All these procedures can be inherently more complex than simple aggregation (i.e., addition) of number values. The embodiments disclosed herein represents a win-win: simpler, almost self-explanatory graphics combined with faster, more efficient processing. The inventive value-aggregation and dynamic award symbol procedures can be implemented on the vast majority of casino gaming machines without requiring upgrades or modifications.

Each of these embodiments and obvious variations thereof is contemplated as falling within the spirit and scope of the claimed invention, which is set forth in the following claims. Moreover, the present concepts expressly include any and all combinations and subcombinations of the preceding elements and aspects.

The invention claimed is:

1. A gaming machine comprising:

a display device configured to present a plurality of symbol positions; and game-logic circuitry configured to:

generate a game cycle counter for a game feature and cause the display device to present the game cycle counter, the game cycle counter having a current count established at an initial value;

for each game cycle outcome of a plurality of game cycle outcomes, visually update the current count of the game cycle counter via the display device and cause the display device to:

populate the plurality of symbol positions with randomly selected symbols; and in response to the randomly selected symbols including an award symbol, present an award sequence for a set of award values associated with the award symbol by visually animating the award symbol to reveal respective award indicia for each award value of the set of award values, wherein a number of award values within the set of award values is at least partially a function of the current count of the game cycle counter; and in response to the current count reaching a termination value, cause the display device to conclude the game feature.

2. The gaming machine of claim 1, wherein the game cycle counter increments in response to each game cycle outcome of the plurality of game cycle outcomes.

3. The gaming machine of claim 1, wherein the number of award values within the set of award values matches the current count.

4. The gaming machine of claim 1, wherein the set of award values is selected from a set of available award values, and wherein the set of available award values changes based on the current count of game cycle counter.

5. The gaming machine of claim 1, wherein the game-logic circuitry is configured to cause the display device to present, for game cycle outcomes including multiple award symbols, separate sets of award values for each of the multiple award symbols.

6. The gaming machine of claim 1, wherein the award sequence is presented in response to the game cycle outcome including the award symbol and at least one additional award condition, the at least one additional award condition including at least one of an additional award symbol populating the plurality of symbol positions, a trigger symbol populating the plurality of symbol positions, the award symbol populating an award position of the plurality of symbol positions, or a random determination.

7. The gaming machine of claim 1, wherein the award sequence includes presenting the award indicia of the set of award values in a sequential order.

8. The gaming machine of claim 7, wherein the presenting the set of award values in the sequential order includes organizing the set of award values to increase in value through the sequential order.

9. The gaming machine of claim 1, wherein the award symbol is a value-bearing symbol having award indicia visually indicating an initial award value of the set of award values prior to the award sequence, the award indicia updated by the display device to visually reveal award indicia for each award value of the set of award values.

10. A method of conducting a game using a gaming system, the gaming system comprising game-logic circuitry and a gaming machine including a display device configured to present a plurality of symbol positions, the method comprising:

generating, by the game-logic circuitry, a game cycle counter for a game feature and causing the display device to present the game cycle counter, the game cycle counter having a current count established at an initial value;

for each game cycle outcome of a plurality of game cycle outcomes, visually updating, by the game-logic circuitry via the display device, the current count of the game cycle counter and causing the display device to:

populate the plurality of symbol positions with randomly selected symbols; and in response to the randomly selected symbols including an award symbol, present an award sequence for a set of award values associated with the award symbol by visually animating the award symbol to reveal respective award indicia for each award value of the set of award values, wherein a number of award values within the set of award values is at least partially a function of the current count of the game cycle counter; and causing, by the game-logic circuitry and in response to the current count reaching a termination value, the display device to conclude the game feature.

11. The method of claim 10, wherein the game cycle counter increments in response to each game cycle outcome of the plurality of game cycle outcomes.

12. The method of claim 10, wherein the number of award values within the set of award values matches the current count.

13. The method of claim 10, wherein the set of award values is selected from a set of available award values, and wherein the set of available award values changes based on the current count of game cycle counter.

14. The method of claim 10 further comprising causing, by the game-logic circuitry, the display device to present, for game cycle outcomes including multiple award symbols, separate sets of award values for each of the multiple award symbols.

15. The method of claim 10, wherein the award sequence is presented in response to the game cycle outcome including the award symbol and at least one additional award condition, the at least one additional award condition including at least one of an additional award symbol populating the plurality of symbol positions, a trigger symbol populating the plurality of symbol positions, the award symbol populating an award position of the plurality of symbol positions, or a random determination.

16. The method of claim 10, wherein the award sequence includes presenting the award indicia of the set of award values in a sequential order.

17. The method of claim 16, wherein the presenting the set of award values in the sequential order includes organizing the set of award values to increase in value through the sequential order.

18. The method of claim 10, wherein the award symbol is a value-bearing symbol having award indicia visually indicating an initial award value of the set of award values prior to the award sequence, the award indicia updated by the display device to visually reveal award indicia for each award value of the set of award values.

19. A gaming system comprising:

a gaming machine comprising a display device configured to present a plurality of symbol positions; and game-logic circuitry configured to:

generate a game cycle counter for a game feature and cause the display device to present the game cycle counter, the game cycle counter having a current count established at an initial value;

for each game cycle outcome of a plurality of game cycle outcomes, visually update the current count of the game cycle counter via the display device and cause the display device to:

populate the plurality of symbol positions with randomly selected symbols; and in response to the randomly selected symbols including an award symbol, present an award sequence for a set of award values associated with the award symbol by visually animating the award symbol to reveal respective award indicia for each award value of the set of award values, wherein a number of award values within the set of award values is at least partially a function of the current count of the game cycle counter; and in response to the current count reaching a termination value, cause the display device to conclude the game feature.

20. The gaming system of claim 19, wherein the number of award values within the set of award values matches the current count.

* * * * *